(12) United States Patent
Woo et al.

(10) Patent No.: US 11,796,996 B2
(45) Date of Patent: Oct. 24, 2023

(54) VEHICLE CONTROL SYSTEM

(71) Applicant: Transportation IP Holdings, LLC, Norwalk, CT (US)

(72) Inventors: Derek K. Woo, Melbourne, FL (US); Mark Bradshaw Kraeling, Melbourne, FL (US); Tyler Listoe, Oakbank (CA); Guillaume Mantelet, Oakbank (CA); Earle Edie, Oakbank (CA); Andrew McKay, Oakbank (CA); Brian Lee Staton, Palm Bay, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 177 days.

(21) Appl. No.: 16/996,621

(22) Filed: Aug. 18, 2020

(65) Prior Publication Data

US 2021/0018909 A1 Jan. 21, 2021
US 2022/0260990 A9 Aug. 18, 2022

Related U.S. Application Data

(63) Continuation-in-part of application No. 16/516,732, filed as application No. PCT/US2018/018689 on Feb. 20, 2018, now Pat. No. 11,284,233.

(60) Provisional application No. 62/888,860, filed on Aug. 19, 2019, provisional application No. 62/460,862, filed on Feb. 19, 2017.

(51) Int. Cl.
*G05D 1/00* (2006.01)
*H04W 4/48* (2018.01)
*H04W 12/00* (2021.01)
*B61L 3/00* (2006.01)
*H04W 12/037* (2021.01)

(52) U.S. Cl.
CPC ............ *G05D 1/0016* (2013.01); *B61L 3/006* (2013.01); *G05D 1/0022* (2013.01); *H04W 4/48* (2018.02); *H04W 12/037* (2021.01)

(58) Field of Classification Search
None
See application file for complete search history.

(56) References Cited

U.S. PATENT DOCUMENTS

| | | | |
|---|---|---|---|
| 7,233,844 B2 | 6/2007 | Peltz et al. | |
| 7,529,201 B2 | 5/2009 | Aiken, II et al. | |
| 7,729,818 B2 | 6/2010 | Wheeler et al. | |
| 8,050,809 B2 | 11/2011 | Geiger et al. | |
| 8,406,943 B2 | 3/2013 | Brand et al. | |
| 2005/0010338 A1 | 1/2005 | Kraeling et al. | |
| 2013/0006443 A1 | 1/2013 | Woo et al. | |

(Continued)

FOREIGN PATENT DOCUMENTS

EP 3219575 A1 * 9/2017 .......... B61L 15/0027

*Primary Examiner* — Saba Tsegaye
(74) *Attorney, Agent, or Firm* — THE SMALL PATENT LAW GROUP LLP; Philip S. Hof

(57) ABSTRACT

A vehicle control system includes a portable operator control unit (OCU). The OCU includes a housing, a power supply inside the housing, a controller inside the housing, and a wireless communication unit attached to the housing. The controller is configured to generate control signals for controlling a vehicle from an off-board location of the OCU. The wireless communication unit is configured to wirelessly communicate the control signals to the vehicle over an LTE network.

19 Claims, 16 Drawing Sheets

(56) References Cited

U.S. PATENT DOCUMENTS

| | | | |
|---|---|---|---|
| 2015/0217790 A1* | 8/2015 | Golden | B61L 15/0036 |
| | | | 701/19 |
| 2016/0019727 A1* | 1/2016 | Norton | G06Q 20/10 |
| | | | 705/13 |
| 2017/0240187 A1* | 8/2017 | Shubs, Jr. | B61L 15/0027 |
| 2018/0112980 A1* | 4/2018 | Diem | G01C 17/38 |
| 2020/0172132 A1 | 6/2020 | Kernwein et al. | |
| 2020/0314600 A1* | 10/2020 | Kolde | H04W 4/40 |
| 2020/0381839 A1* | 12/2020 | Shahvirdi Dizaj Yekan | |
| | | | H01Q 3/20 |

* cited by examiner

VEHICLE CONTROL SYSTEM

CROSS-REFERENCE TO RELATED APPLICATIONS

This application relates to and claims priority benefits from U.S. Provisional Application No. 62/888,860, entitled "Vehicle Control System," filed 19 Aug. 2019, which is incorporated herein by reference in its entirety.

This application is a continuation-in-part of U.S. patent application Ser. No. 16/516,732 (the "'732 Application"), entitled "Vehicle Communication System," filed 19 Jul. 2019. The '732 Application is a national stage application pursuant to 35 U.S.C. § 371(c) of PCT Application No. PCT/US2018/018689 (the '689 Application"), filed 20 Feb. 2018, which claims priority to U.S. Provisional Application No. 62/460,862 (the '862 Application"), filed 19 Feb. 2017. The '732, '689, and '862 Applications are incorporated herein by reference in their entirety.

BACKGROUND

Technical Field

Embodiments of the subject matter described herein relate to communication and control systems for vehicles.

Discussion of Art

Remote vehicle control involves a vehicle system, including a single vehicle or a group of vehicles, being controlled from an off-board location. For example, the vehicle system may be unmanned and controlled by an off-board operator or control system, to move the vehicle system from one location to another or to perform a work operation. In various situations, remote or off-board control may be more efficient than human operator control. In the same or other situations, it may not be practical or possible to have on-board human operators. Typically, such remote control is wireless, using proprietary radios. While functional, such radios may require outfitting the vehicle system with specialized, single-purpose equipment that requires extra cost and maintenance. Also, the radios may be electrically inefficient in operation, may lack acceptable communication security features, may require special regulatory approval, and/or the like.

It may be desirable to provide vehicle control and communication systems and methods that differ from existing systems and methods.

BRIEF DESCRIPTION

In an embodiment, a vehicle control system includes a portable operator control unit (OCU) having a housing, a power supply inside the housing, a control interface attached to the housing and which is configured to be manipulated by an operator, a controller inside the housing, and a wireless communication unit attached to the housing. The controller is configured to generate control signals for controlling a vehicle based on operator manipulation of the control interface. The wireless communication unit is configured to wirelessly communicate the control signals to the vehicle over a high-frequency wireless network, meaning at frequencies of at least 450 MHz, e.g., an LTE network (such as a public LTE network), a 5G network, or in a frequency range of from 30 GHz to 300 GHz.

In an embodiment, a vehicle control system includes a remote-control unit having a housing, a power supply inside the housing, a controller inside the housing, and a wireless communication unit attached to the housing. The controller is configured to generate control signals for controlling a vehicle based on internal program instructions and received sensor signals, e.g., which contain data of vehicle operations and/or route conditions. The wireless communication unit is configured to wirelessly communicate the control signals to the vehicle over a high-frequency wireless network, meaning at frequencies of at least 450 MHz, e.g., an LTE network (such as a public LTE network), a 5G network, or in a frequency range of from 30 GHz to 300 GHz.

In an embodiment, a vehicle control system is provided that includes a portable operator control unit (OCU). The OCU includes a housing, a power supply inside the housing, a controller inside the housing, and a wireless communication unit attached to the housing. The controller is configured to generate control signals for controlling a vehicle from an off-board location of the OCU. The wireless communication unit is configured to wirelessly communicate the control signals to the vehicle over an LTE network.

In an embodiment, a vehicle control system is provided that includes an on-board control unit that has a controller and a wireless communication unit configured for operable coupling with the controller. The controller and wireless communication unit are configured for attachment to an electrical power source in a vehicle. The controller is configured for communicative coupling with at least one of a vehicle controller or a brake system of the vehicle. The wireless communication unit is configured to wirelessly receive control signals from an off-board operator control unit (OCU) over an LTE network. The controller is configured to control the at least one of the vehicle controller or the brake system based at least in part on the control signals that are received from the OCU.

In an embodiment, a vehicle control system is provided that includes a portable operator control unit (OCU) and an on-board control unit. The OCU includes a housing, a power supply inside the housing, a control interface attached to the housing that is configured to be manipulated by an operator, an OCU controller inside the housing, and an OCU wireless communication unit attached to the housing. The on-board control unit includes an on-board controller and an on-board wireless communication unit configured for operable coupling with the on-board controller. The on-board controller and on-board wireless communication unit are configured for attachment to an electrical power source in a vehicle. The on-board controller is configured for communicative coupling with at least one of a vehicle controller or a brake system of the vehicle. The OCU is configured for linking with the on-board control unit, for remote control of the vehicle by the OCU, by the OCU wireless communication unit wirelessly communicating control signals to the on-board wireless communication unit over a public LTE network.

BRIEF DESCRIPTION OF THE DRAWINGS

The inventive subject matter may be understood from reading the following description of non-limiting embodiments, with reference to the attached drawings, wherein below.

DETAILED DESCRIPTION

Certain embodiments of the inventive subject matter relate to wireless communication systems for vehicle systems (also referred to herein as vehicle consists). The system includes a mobile server unit that is operably deployable on a vehicle, e.g., the mobile server unit is sized for being carried onboard the vehicle and has electrical power requirements that can be met by the onboard power system of the vehicle during travel. The mobile server unit is an "eNodeB" or other base station that includes hardware for direct wireless LTE communications with plural mobile client units. Thus, the mobile server unit includes one or more antennas, RF transceivers, and controllers. The mobile server unit is configured to establish a wireless onboard private LTE network with plural mobile client units that are located on other vehicles of the vehicle system. The private LTE network can be used to transmit data signals and/or control or command signals between the vehicles in the vehicle system. Examples include sensor-generated status or operational information, and commands for coordinated braking, distributed power control, and emergency or safety control.

In certain situations, two or more vehicles in a vehicle system or consist may each include a respective mobile server unit. This may be the case if all vehicles in a given transportation system are outfitted with mobile server units, or if certain classes or types of vehicles in a given transportation system are outfitted with mobile server units. For example, in a rail context, certain locomotives may be outfitted with mobile server units. If a train is assembled that includes plural server-equipped locomotives, the train would thereby include plural mobile server units. Thus, in an embodiment, each mobile server is configured to establish the wireless onboard private LTE network in coordination with any other mobile server units that are onboard the vehicle system and operational. As explained in more detail below, this may involve selecting a designated master mobile server unit, which is responsible for overall network operation, whereas the other mobile server units operate as clients, and/or as servers for sub-network portions of the overall onboard network.

As explained in further detail below, other aspects relate to admission and authorization of mobile client units to the network, changing and selection of network channels, server coordination, vehicle order determination, strategies for LTE communications in dynamic environments, and network/communication timing control.

Figure 1:
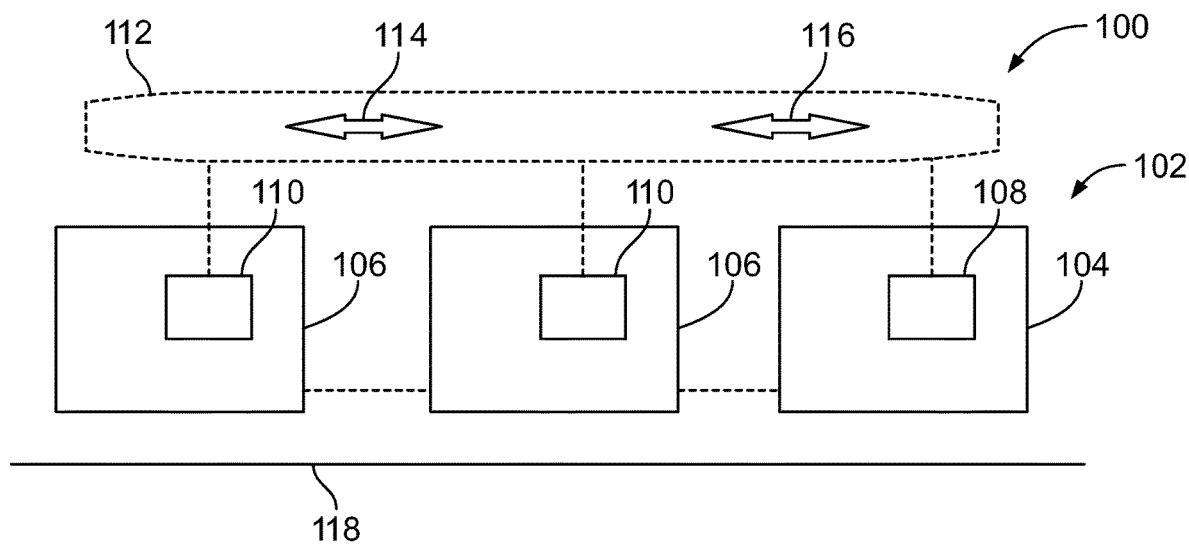
FIG. 1 is a schematic illustration of a vehicle communication system, according to an embodiment.

FIG. 1 shows an embodiment of vehicle communication system 100 for a vehicle system 102. The vehicle system includes a first vehicle 104 and plural (two or more) second vehicles 106, which are mechanically or logically coupled for travel in concert. A first mobile server unit 108 is operably deployed onboard the first vehicle 104. Plural mobile client units 110 are operably deployed on the second vehicles 106. For example, there may be one mobile client unit on each vehicle, plural mobile client units on a single vehicle, or some combination thereof. The mobile server unit 108 is configured to establish a wireless onboard private LTE network 112 with the plural mobile client units 110, for wireless communications of data signals 114 and/or control signals 116 between the vehicles of the vehicle system while the vehicle system is moving for travel, e.g., along a route 118.

"Private LTE network" refers to an ISM (industrial-scientific-medical) band of the radio-frequency spectrum that allows unlicensed use of LTE technology (e.g., LTE, 4G LTE, LTE Advanced, 5G LTE, etc.) for private, cellular network-like, wireless/RF communications. "LTE" refers to the "Long-Term Evolution" standard for high-speed wireless communications (e.g., for mobile phones and data terminals), based on GSM and UMTS technologies, and as developed/specified by the $3^{rd}$ Generation Partnership Project/3 GPP. An "onboard" network, as used herein, is one established by a mobile server unit (e.g., eNodeB, LTE base station, or the like) that is onboard a vehicle of a vehicle system, at least for communications between vehicles of the vehicle system. (This does not preclude the possibility of modes of operation where there are also communications between the onboard network and offboard networks.) An "offboard" network is one that is established by equipment (e.g., an eNodeB or other base station) that is not on a given vehicle system, e.g., it may be on a different vehicle system, or fixed in place to the ground or otherwise not located on any vehicle. A "public" network is any cellular communication network, typically operated by a mobile service provider, which is accessible to any member of the general public with suitably-configured mobile phones or other user equipment.

Figures 2, 3:
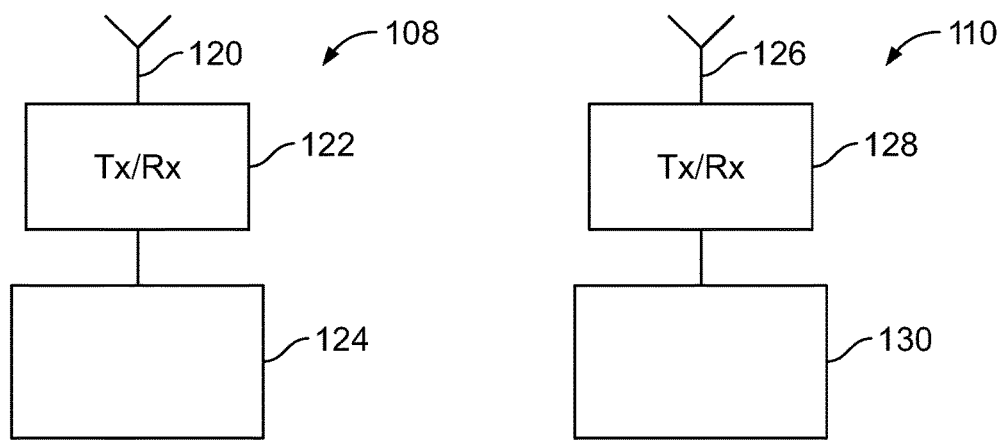
FIG. 2 is a schematic diagram of a mobile server unit, according to an embodiment.
FIG. 3 is a schematic diagram of a mobile client unit, according to an embodiment.

As mentioned above, the mobile server unit 108 (also referred to as simply a "mobile server") is an eNodeB or other base station that includes hardware for direct wireless LTE communications with plural mobile client units. For example, the mobile server unit may be configured to communicate timing patterns so that mobile client units can communicate with it. Further, it may be the case that while operating as a server, the mobile server unit can only communicate with the mobile client units and not with another private LTE network or a public LTE network. FIG. 2 shows an embodiment of the mobile server unit 108 in more detail. The mobile server unit includes one or more antennas 120, one or more RF transceivers 122 coupled to the antenna(s), and one or more controllers 124 coupled to the transceiver(s). The antenna is a transducer that is configured to transmit and receive RF waves in all or a part of the LTE frequency bandwidth. The transceiver is configured to power the antenna for transmitting signals, and to receive and convert signals arriving at the antenna. (The term "transceiver" includes transmitter-receivers, i.e., separate receivers and transmitters.) The controller includes one or more microprocessors and other circuitry, and controls the transceiver for sending and receiving information wirelessly, for LTE network control purposes and otherwise. The controller may also interface with other electronic devices located onboard the first vehicle and/or the vehicle system that use and/or generate information to be communicated. Unlike mobile client units, the mobile server unit coordinates LTE network communications with plural mobile client units, and carries out various network control functions such as radio resource management, resource block control, connection mobility control, radio admission control, dynamic resource allocation and scheduling, and so on.

Each mobile client unit 110 (also referred to as a "mobile client") is a wireless LTE device that must communicate with a server (i.e., eNodeB or other base station) for its communications. If a given vehicle includes a single mobile client unit deployed thereon, then the term may also be used to refer to the vehicle itself. That is, as used herein, a vehicle outfitted with a wireless LTE device that must communicate with a server for LTE network communications may be referred to as a mobile client. With reference to FIG. 3, the mobile client unit 110 may include one or more antennas 126, one or more transceivers 128, and one or more controllers 130. The antenna is a transducer that is configured to transmit and receive RF waves in all or a part of the LTE frequency bandwidth. The transceiver is configured to power the antenna for transmitting signals, and to receive and convert signals arriving at the antenna. The controller includes one or more microprocessors and other circuitry, and controls the transceiver for wireless communications with a mobile server unit. The controller may also interface with other electronic devices located onboard the vehicle on which the mobile client unit is deployed, which use and/or generate information to be communicated. The controller may also interface with other electronic circuits that are part of the mobile client unit. For example, the mobile client unit may include a processor that controls a user interface portion of the mobile client unit, whereas the controller 130 is specific for controlling wireless communication aspects of the device. Alternatively, the controller may control both wireless communications and other functions.

Figure 4:
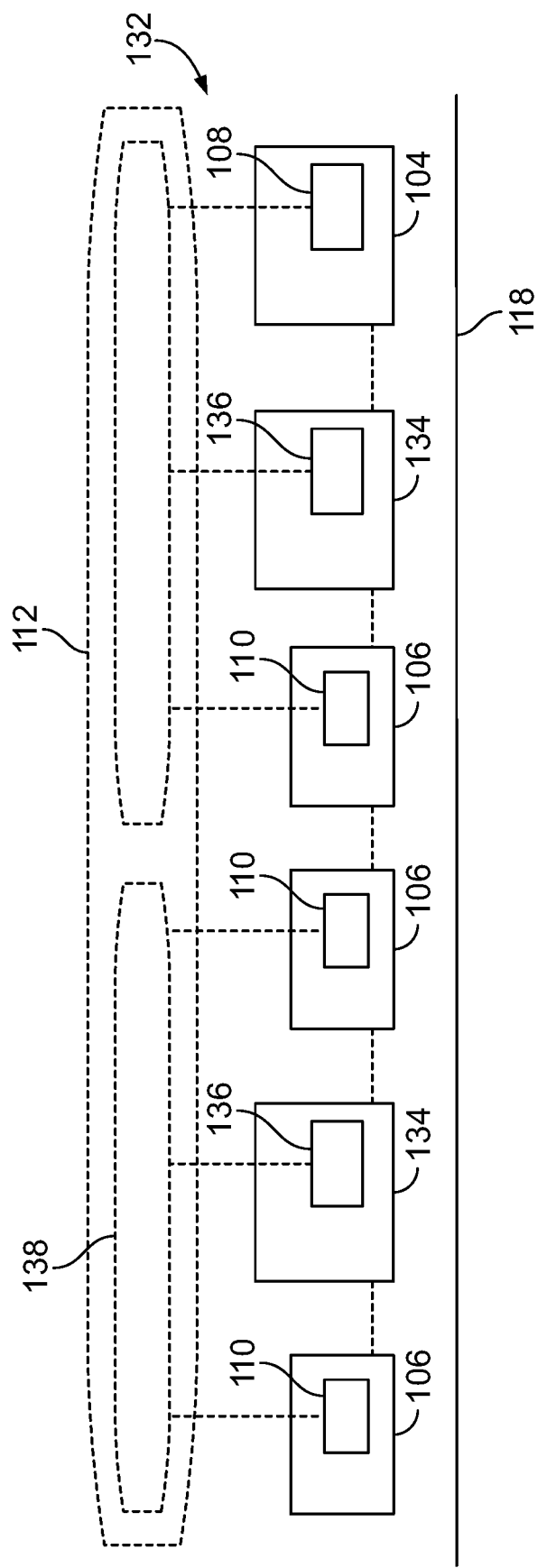
FIG. 4 is a schematic illustration of another embodiment of a vehicle communication system.

With reference to FIG. 4, a vehicle system 132, in addition to including the first vehicle 104 (outfitted with mobile server unit 108) and the plural second vehicles 106 (outfitted with the mobile client units 110), may also include other/third vehicles 134 onboard each of which is a respective second mobile server unit 136. For example, as mentioned above, locomotives in a rail transportation system may be outfitted with mobile server units, and there may be times when multiple such locomotives are included in a train. Thus, in an embodiment, the first mobile server unit 108 is configured to establish the onboard private LTE network 112 in coordination with other mobile server units 136 onboard other vehicles in the vehicle system. To put it another way, each mobile server unit 108, 136 that is part of the vehicle communication system 100 may be configured to coordinate with other mobile server units that are part of the same vehicle system, for establishment of the onboard private LTE network 112. Of course, if a given vehicle system includes only one mobile server unit, such as illustrated in FIG. 1, then there is no need for such intra-vehicle system coordination in that instance, keeping in mind that because vehicles may be assembled into different vehicle systems over time (e.g., for different trips or missions), the mobile server units will typically be provided with coordination functionality in case it is ever needed.

Figure 5:
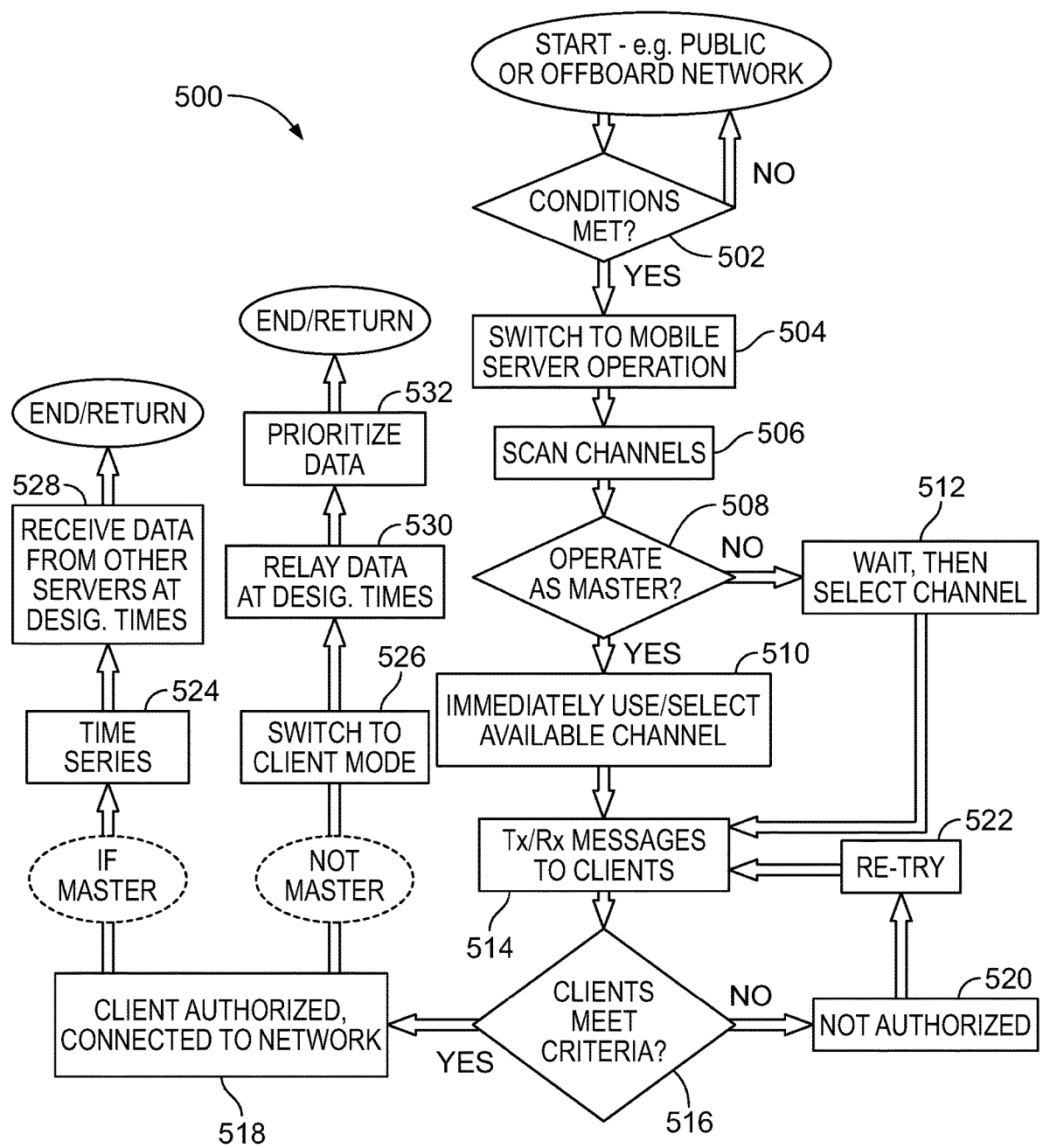
FIG. 5 is a flow diagram illustrating various aspects of mobile server operation.

FIG. 5 illustrates various operational aspects (methods of operation) 500 of the mobile server units 108, 136. As should be appreciated, in any given implementation or embodiment, fewer than all of the indicated aspects may be used, or additional aspects may be used, or the indicated aspects may be carried out in a different order or arrangement. The mobile server unit (deployed on a vehicle in a vehicle system) may be configured to determine if and when it switches to operate as a server. For example, the communication system may be set up so that under certain circumstances, the mobile server unit is connected to an offboard private LTE network or to a public LTE network, e.g., the mobile server unit is in an operational mode where it operates as a mobile client. Such circumstances may include, for example, the vehicle on which the mobile server unit is deployed being parked or in a yard, e.g., in the case of a rail vehicle, in a rail yard or switching yard, and/or the vehicle not being connected to any other vehicles as part of a vehicle system or consist. (A rail yard, for example, may have its own private LTE network that is used to communicate with vehicles in the yard.) Thus, the mobile server unit may be configured, as at 502, to determine if one or more designated conditions or criteria have been met for the mobile server unit to switch (e.g., from operating as a client) to operating as a server. The criteria may relate to the vehicle system being located far enough away from a rail yard or other location to reduce the likelihood of interference from other networks, and/or the vehicle (on which the mobile server unit is deployed) being part of a vehicle system. Thus, the criteria may include: the first vehicle or the vehicle system transitioning from a stationary state to a moving state; the first vehicle or the vehicle system moving continuously for a designated amount of time; the first vehicle or the vehicle system moving a designated distance; the first vehicle or the vehicle system leaving a first designated geographic region (i.e., geo-fencing); the first vehicle or the vehicle system entering a second designated region; the vehicle system being in a distributed power mode of operation; the first vehicle or the vehicle system traveling above a designated speed (e.g., the designated speed is a speed limit within an area where the server unit is not to operate as a server, and outside the area there is a higher speed limit); the first vehicle being connected to other vehicles to form the vehicle system; and/or the like.

If the conditions or criteria are met, at 504 the mobile server unit switches to operating as an LTE server. Since the private LTE network uses ISM channels that are present, the mobile server units may be configured to change to uncongested private LTE channels. Also, if there are multiple mobile server units in a vehicle system (e.g., each setting up its own private network for the vehicles around it), coordination is required. Thus, the mobile server unit is configured, at 506, to scan the available LTE channels to look for other LTE networks. This may be done, for example, for identifying other mobile server units that are active in the vehicle system. At 508, the mobile server unit determines if it should be the mobile server master for the vehicle system. The mobile server master is the selected or designated mobile server unit in a vehicle system that controls the overall LTE network and that serves as the master to other mobile server units in the vehicle system. The determination may be based on vehicle position or other vehicle criteria, e.g., whichever mobile server unit is in a lead vehicle of the vehicle system (front-most vehicle, or designated control lead) is the mobile server master. Thus, at 508 the mobile server unit may access a consist list that is stored in memory. The consist list is a list of the vehicles that make up the vehicle system, which may be uploaded to the vehicles when the vehicle system is assembled. If the consist list indicates that the vehicle in which the mobile server unit is deployed meets the criteria (e.g., lead vehicle), then the mobile server unit knows it should be the mobile server master, and proceeds accordingly.

If the mobile server unit is designated/selected as the mobile server master, at 510 it immediately uses/selects an available channel. Other mobile server units in the vehicle system will wait additional time, to allow for the mobile server master to become active (e.g., if the mobile server master is on the lead vehicle, for taking into consideration other mobile server units in front of them), and then also evaluate and choose a channel, as at 512. If the mobile server unit is not designated/selected as the mobile server master, it will wait and then choose a channel like the other non-designated/selected mobile server masters. Again, as should be appreciated, by waiting for designated criteria to be met (e.g., by waiting a configurable amount of time while moving) before the mobile server units activate as servers, this will allow sufficient time for the vehicle system to move away from congested areas (e.g., the private LTE network that is in a railyard) so that all available channels can be seen.

The mobile server units may be configured to evaluate the best channels to use based on a ratio of the strongest server RSSI subtracted by the noise floor, with weighting given to number of masters on a particular channel. Also, in the event that a mobile server unit is having issues due to presence of other servers (masters) in the area, an evaluation to move to a different channel can be made. This is done immediately.

Figure 6:
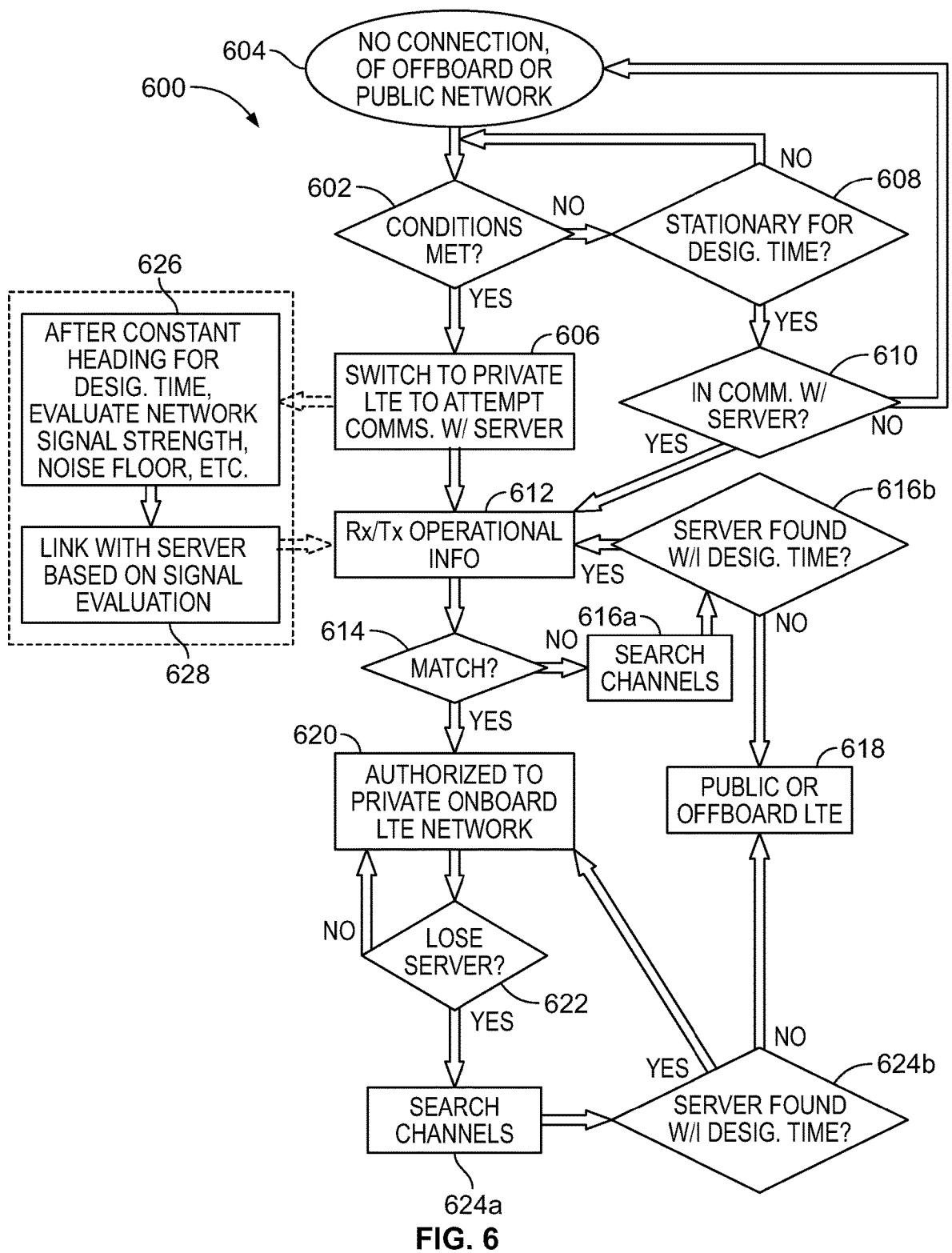
FIG. 6 is a flow diagram illustrating various aspects of mobile client operation.

Turning additionally to FIG. 6, which shows operational aspects (methods of operation) 600 of the mobile client units, the vehicle communication system is additionally configured for authorizing/controlling the mobile client units to link to the onboard private LTE network 112, e.g., the mobile client units are configured to determine or select which mobile server unit to connect to. For a given mobile client unit, the mobile client unit is configured, as at 602, to determine if one or more designated criteria or conditions are met for the mobile client unit to switch to an onboard private LTE network. The criteria may be the same as those discussed above with reference to 502. For example, since a mobile client unit that is moving can assume it is part of a vehicle system, the criteria may include a configurable amount of time continuously moving. If the criteria or conditions are met, the mobile client unit switches (e.g., from connection to a public LTE network as at 604) to an onboard private LTE network channel to attempt communications with a mobile server unit, as at 606. The mobile client unit may be further configured to determine (e.g., responsive to the conditions not being met at 602) if the mobile client unit has been stationary for a configurable amount of time, as at 608, which is indicative that the mobile client unit and/or its vehicle is possibly orphaned. The mobile client unit is configured, if it has been stationary for the amount of time, to revert to individual operation and connection with a public LTE channel (as at 604), unless active communications with a mobile server unit are taking place, as at 610. The mobile server units may be configured to communicate with the mobile client unit to indicate the vehicle on which the mobile server unit is deployed (e.g., a locomotive) is distributed power "unlinked," meaning the vehicle is moving to another consist. (In which case, if that is the only mobile server unit with which the mobile client unit is in communication, the mobile client unit may revert back to the public LTE network.)

To authorize mobile client units to the onboard private LTE network, the mobile server unit and the mobile client units may be configured to exchange information to determine if the mobile client units are part of the same vehicle system as the mobile server unit. This enables the mobile client units to be authorized "on the fly," without necessarily having been previously configured (such as before the vehicle system was assembled) to access to the onboard private LTE network. (This assumes it is desired for all mobile client units that are onboard a vehicle system to be able communicate over the onboard private LTE network of the vehicle system. If not, the mobile client units and/or mobile server units may be additionally configured for other/additional network connection and authorization functionality, such as all mobile client units within a fleet of a given transportation company or other entity being provided with an onboard network access code that is exchanged with mobile server units for authorization.) Thus, the mobile client unit may be configured, as at 612, to transmit designated operational information of the vehicle in which the mobile client unit is deployed to the mobile server unit with which it is in communication. The designated operational information is received by the mobile server unit, as indicated at 514 in FIG. 5. The operational information is any designated information that is likely to be uniquely associated with operation of the vehicle system. For example, it may be a time period of how long the vehicle has been continuously moving since having been stopped (i.e., travel time), speed information (e.g., multiple speeds at different points in time), heading information (e.g., multiple headings at different points in time), brake pipe pressure, location information, and/or the like. The operational information may be adjusted, calibrated, or correlated to take into account differences between where the mobile client unit and the mobile server unit are located in the vehicle system. For example, in the case of a long train, a rear railcar may not start traveling at the same time as the lead locomotive. However, the mobile server unit can be configured to adjust received travel time information based on where the mobile client unit is located in the vehicle system (from a consist list or as otherwise determined), or the mobile server unit can be configured to look at the travel time relative to a given threshold (e.g., all vehicles in a vehicle system would have started moving within "x" seconds of when the vehicle of the mobile server unit started moving), or the mobile server unit can be configured to look at multiple factors, or the mobile server unit and/or the mobile client units can be configured to calculate/determine the operational information only after (relative to when) a designated event or condition has occurred. For example, in the case of travel time, the travel time could be determined relative to when the vehicles in the vehicle system first started traveling at or above a designated speed, which is selected as a speed where it is likely that all vehicles in the vehicle system would be currently moving. (In the case of a train or other rail vehicle consist that commences movement after having been stopped, for example, it is unlikely that one vehicle in the consist would be traveling, say, at 30 kph while another vehicle in the consist is stopped.)

At 516, the mobile server unit is configured to determine if the operational information received from the mobile client unit meets one or more designated criteria. For example, the mobile server unit may determine if the received operational information (as received, or as correlated/adjusted) matches corresponding operational information of the mobile server unit or the vehicle in which the mobile server unit is deployed. For example, the mobile server unit may compare received travel time to its own travel time, to see if they match (e.g., exactly, or within a designated threshold). If the operational information meets the one or more designated criteria, the mobile client unit, as at 518, is connected/authorized to the onboard private LTE network of the mobile server unit. If not, as at 520, the mobile client unit is not connected/authorized to the network, and there may be a re-try period as at 522. For example, with reference back to FIG. 6, if the operational information meets the one or more designated criteria (e.g., a match) as at 614, the mobile client unit is connected/authorized to the network, as at 620. If not, the mobile client unit may be configured, as at 616a, 616b, to search available private LTE channels for finding a server unit or other server unit within a designated time period. If a server unit is found within the designated time period, the mobile client unit may transmit the designated operational information to that mobile server, etc. If not, the mobile server unit may switch to public LTE network access, as at 618.

As should be appreciated, the communication system 100 may be set up so that the mobile server units transmit designated operational information to the mobile client units for the mobile client units to assess the given criteria for network access, or for the mobile servers and mobile clients to exchange such information. Also, there may be additional security measures or requirements for authorizing mobile client units to the onboard network, such as network keys, the mobile client units having proper or designated communications security features, lists/databases of authorized devices, consist lists (e.g., whether the mobile client unit is onboard a vehicle that is on the consist list as being part of the vehicle system), and so on.

Further regarding channel selection, the mobile client unit may be configured, if it loses communications with its mobile server unit on a particular channel for a configurable amount of time, as at 622, to conduct a search on available private LTE network channels to find its old server unit on other channels. If the server unit is not found within a configurable (e.g., long) period of time, as at 624a, 624b, the mobile client unit switches to a public LTE network, as at 618. This could be done if the mobile server unit is malfunctioning or turned off—either way it is unavailable. On the other hand, if the server unit is found, it is reconnected, regardless of time or movement.

As mentioned, if there are multiple mobile server units on a vehicle system, the system is configured for coordination among the multiple server units. More specifically, if a mobile server unit is on vehicle that is remote from the vehicle of the mobile server master (e.g., on a distributed power remote locomotive), it may operate as a server for any mobile clients around it, i.e., it may establish its own private LTE network 138 (see FIG. 4) with nearby client units, which is in effect a sub-network of the overall vehicle system network. In the case of multiple such remote mobile server units, there may be plural private LTE networks/sub-networks established on the vehicle system at any given time. The mobile server units thereby communicate with their respective mobile clients and also with the mobile server master (e.g., lead locomotive). This may involve using GPS time to determine when the mobile server units (remote and master) should spend time syncing up. Also, this can be done by using the amount of time continuously moving, as well as a database or consist list so that the server units know which units are in the vehicle system.

For coordination, in an embodiment, the mobile server units that are part of a consist of other mobile server unit-equipped vehicles (e.g., a locomotive consist), that is, adjacent to or otherwise in close proximity to other mobile server unit-equipped vehicles, will use the lead mobile server unit (e.g., lead locomotive) as the mobile server master. As at 524 in FIG. 5, the mobile server master will set up a time series, where mobile servers that are not the master (e.g., remote or trailing locomotives in a network) will join the master mobile server at certain times to relay data (TDMA-like access). As at 526, trailing mobile server units (e.g., mobile server units that are on trailing locomotives, or otherwise not on lead vehicles of a vehicle consist) will have the option of not being a mobile server—as their close proximities to the mobile server master (e.g., lead locomotive) or lead remote does not necessarily help in network health. In this case, they will switch to a mode for operating as mobile clients. At specific time intervals, the mobile server master will coordinate messaging with the mobile clients that are typically mobile servers (the mobile servers will change type for this time interval). This is so information can be transmitted to the mobile server master from other server units (e.g., so that information can be brought forward to the front of the train), as at 528 and 530. In other words, for specific/designated time events, the mobile servers switch modes to temporarily operating as mobile clients, in order to relay information to the mobile server master (e.g., to the front of the train). Time intervals for communicating information in this situation (e.g., for bringing information to the front of the train) may involve critical data first for the safe operation of the vehicle system, and time slots will be set up to allow this prioritization of messaging, as at 532. Messages that are not acknowledged by the mobile server master will have the capability of being repeated, again more so based on their criticality. Also, the system may be configured for frequency coordination during these events, for example, based on the vehicle system maintaining a specific heading for a period of time (e.g., covering the length of the train based on speed) because directional antennas on the mobile server units will be most useful then (in a straight line).

Because the onboard private LTE network is established on a moving vehicle system, the communication system 100, in embodiments, is configured to address dynamic aspects of the communication environment, e.g., obstructions, multipath, and fading. In one aspect, for a train or other linear vehicle system, one or more of the antennas 120, 126, but more typically the antennas 126 on mobile client units, may be directional antennas. This would focus the RF signals from back to front (or vice versa in the case of mobile server units on a train), thereby facilitating a certain level of noise immunity. Further, understanding the heading of the vehicle system allows a mobile client unit to make the best decision when it comes to choosing a mobile server unit to participate with. Thus, as at 626 in FIG. 6, the mobile client unit may be configured, when searching for a private LTE network and having been at a constant heading for at least a certain/designated amount of time, to evaluate signal strength and noise floor to choose the correct or best mobile server unit, as at 628. Listening to the current mobile server should provide information on other mobile servers that are part of its network, including the mobile server master. In embodiments, a mobile client unit has a choice of communicating an urgent event (e.g., for the safe operation of the vehicle system) to not only its current mobile server, but change frequencies to send this status/information to another mobile server or more importantly the mobile server master (e.g., at the front of the train). Also, according to another aspect, a mobile client unit may be configured to exist in a state where it remains a member of a network, even if it has not seen its mobile server for a period of time. For example, it is expected that a mobile client unit may not see its mobile server continuously (e.g., due to tunnels, heavy foliage, or turns), and should queue status events or other communications until the mobile server returns.

The mobile server units, as mentioned, may also include directional antennas. Also, they may each include multiple respective antennas, e.g., one that is directional, and one that is omni-directional. In such a case, the mobile server units would be configured to choose which antenna to use based on whether the mobile server transitions to acting as a mobile client in the event of connection to a public LTE network. Alternatively or in addition, multiple directional antennas may be provided for spatial diversity for onboard communications. Further, the mobile server units may be configured to periodically provide information to the mobile clients about the makeup of the network, including the frequency channels of other mobile servers and the mobile master. This allows a mobile client unit to understand the network topology and make more informed decisions for switching mobile servers.

The communication system 100 may be further configured for antenna performance to be evaluated for longer time periods. Depending on the directional antenna type, for example, average RSSI values can be recorded by mobile clients that are in the network. Depending on the order of the mobile clients, if on the same heading for a period of time (straight line), the signal strength from antenna to mobile client should be very close to the same for a given distance. If the signal levels are appreciably different, an antenna issue can be detected. This would need to be done over a longer period of time due to elevation changes and antenna placement.

For private LTE network operation, it may be necessary or desirable to time synchronize the mobile client units and the mobile server unit(s). Time synchronization benefits are two-fold. First, a centralized analytics system is able to report events efficiently based on the time reported by the different sensors on the whole vehicle system. Second, TDMA access is guaranteed by properly configuring time slots to the different mobile clients. Also, a TDMA scheme can be extended to the different sensors in the vehicle system (e.g., used for monitoring vehicle operating conditions), for receiving sensor information on tight schedules. Time-sensitive networking specifies that networks with no more than seven hops are able to guarantee sufficient accuracy when distributing time. Even in cases involving distributed locomotives, each private LTE network may fail to distribute time accurately to a set of distant mobile clients. Thus, the communication system 100 may be further configured for distributing precise timing. For example, sync messages (and possibly follow ups) may be used to synchronize real time clocks. In one embodiment, time domains are partitioned between (sub) mobile servers. Sub mobile servers would be mobile clients augmented with an access to an accurate time source (such as GPS time) to avoid time discrepancies between domains. In another embodiment, a networking distribution time is defined where a mobile server would be a root mobile server distributing and communicating with sub mobile servers.

One aspect of establishing a private LTE network in a multi-vehicle system may involve the actual ordering of the vehicles. As such, with reference to FIG. 7, the communication system may be configured to carry out one or more methods 700 to determine the approximate placement of vehicles throughout a vehicle system. (Such methods are in fact applicable to any wireless network.) For example, in an embodiment, the mobile server master (e.g., lead locomotive or other lead vehicle) is configured, as at 702, to determine that a measurable event is taking place, including a change in speed (speed delta over a given time/rate), change in heading after going in one direction for a length of time calculated to be as long as the vehicle system (heading delta over a given time/rate), brake pipe pressure change event (BPP over time/rate), or the like. When this event occurs, the mobile server master transmits a message to the network indicating the occurrence of the event and the time when the event occurred, as at 704. This message includes the actual real calendar time when the event occurred (for instance, "At 3:59:21 pm a change in direction from 10 degrees to 45 degrees was completed, and I have been at 45 degree heading for 10 seconds"). The mobile server master then listens for mobile clients in the network to also have this event occur, as at 706. This event also applies to mobile server units (e.g., locomotives) that are not the mobile server master (e.g., not on the lead locomotive in the consist). The events, as they occur, on a trailing or remote vehicle (equipped with a server unit) will act just like the mobile client unit entries in this situation. This can be done to understand or verify vehicle order, as at 708. Specifically, if an event occurs at the lead vehicle at a given time, the next vehicle where the event next occurs should be closest to the lead vehicle, the next vehicle where the event next occurs should be next in order, and so on. Also, the "event seen" messages can be used to understand if a mobile client-equipped vehicle (e.g., railcar) is closer to another mobile server-equipped vehicle (e.g., locomotive) as opposed to the network that it is participating in. A trailing or remote mobile-server equipped vehicle can also announce this event cycle from the lead for the members of its network, acting as a relay node for the message.

Figure 7:
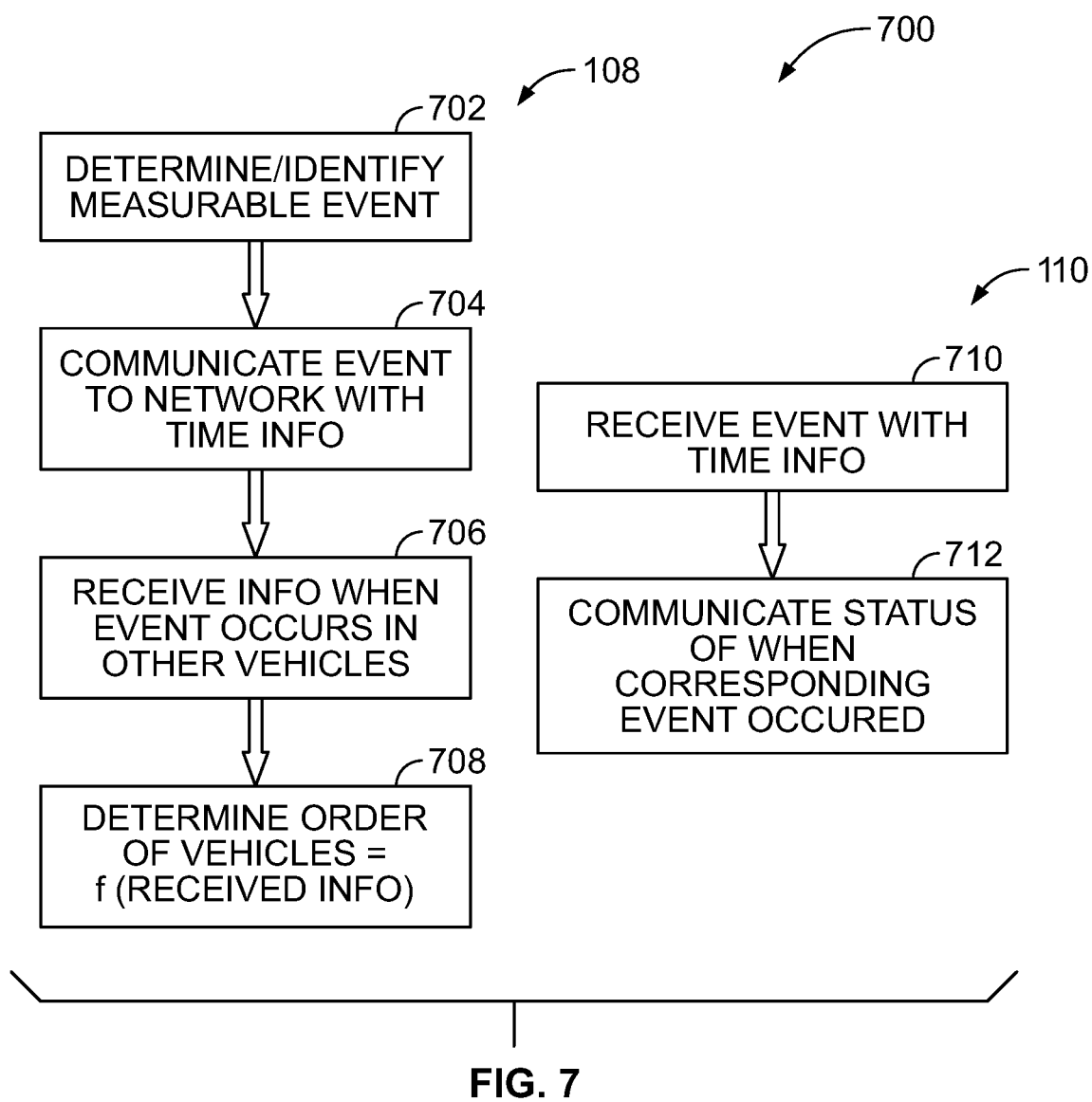
FIG. 7 includes flow diagrams of a method for determining vehicle order in a vehicle system, according to an embodiment.

Further with reference to FIG. 7, the mobile client units are configured, as at 710, to listen for the ordering start messages to occur. Whether it is change in speed, change in heading, change in brake pipe pressure, or otherwise, when these events occur the mobile client unit will announce its status, as at 712. The status on a vehicle (on which the mobile client is deployed) will always be announced—decision making for whether it is correct or not will be made at the server level. Announce messages help mobile servers and mobile clients to determine/locate the master clock (likely to be a mobile master server), and help (sub) server nodes act as a slave where they receive the time from the master clock, and become a master clock for the mobile clients connected to it. A mobile client can also use the announce message to take the announce time, and based on when the event is seen, have an approximation of how far back in the vehicle system the mobile client is.

Once the mobile client has announced its status, the mobile server can also send a message back to the mobile client to verify it is a member of its vehicle system, or possibly also let the mobile client know that it is no longer a member of the network (e.g., because it did not respond to announce message for heading change). The mobile client has the option of telling the mobile server that it never received the announce message for ordering, so it has an option of staying in the network.

Alternatively or additionally, determinations of vehicle ordering or positioning in an LTE network-equipped vehicle system may be based on using Observed Time Difference of Arrival (OTDOA) and/or enhanced Cell ID (eCID). An overview of these LTE features is available in Mike Thorpe, M. Kottkamp, A. Rossler, J. Schutz, "LTE Location Based Services Technology Introduction-White paper", Rohde & Schwarz (April 2013), available at http://www.rohde-schwarz-wireless.com/documents/LTELBSWhitePaper_RohdeSchwarz.pdf, which is incorporated by reference herein.

Figure 8:
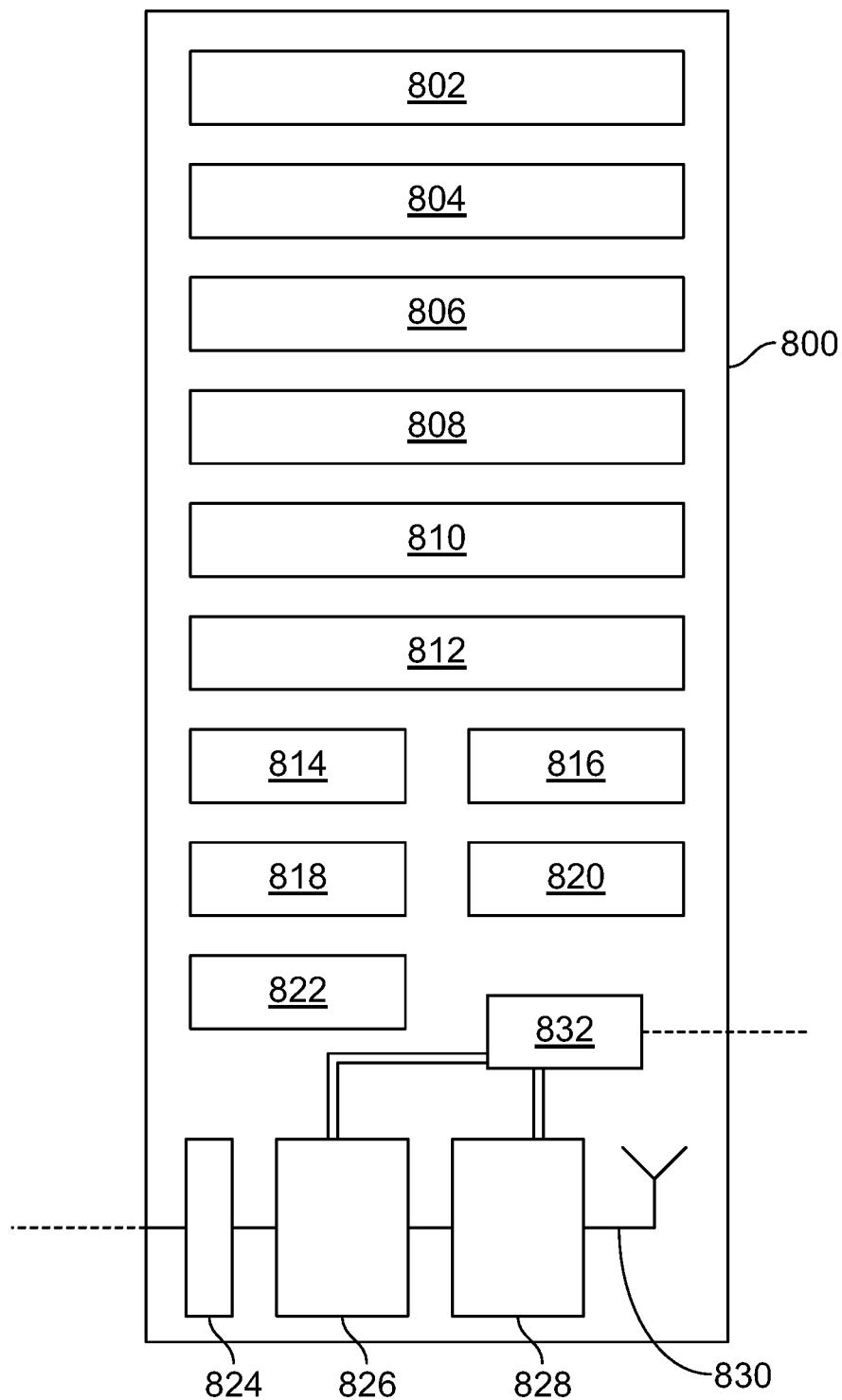
FIG. 8 is a schematic diagram of an embodiment of a mobile server unit.

FIG. 8 shows a functional and schematic diagram of an example of a mobile server unit 800, e.g., as might be applicable for use as the units 108, 136, etc. The mobile server unit includes a chassis, cabinet, or other housing (not shown), which houses one or more controllers (e.g., microprocessors and related circuitry) 826, one or more RF amplifier and transceiver circuits 828, one or more antenna ports 830 for attaching one or more antennas or antenna leads to the RF amplifier and transceiver circuits, a power supply 832 (connected to an onboard power source, such as an electrical bus, not shown), and an input/output (I/O) block 824 connected to the controllers. For example, the I/O block may include various ports and related circuitry to electrically connect the unit to an onboard Ethernet network, an onboard vehicle controller, another onboard control or communications bus, etc. The one or more controllers are configured (by way of programming stored in memory, and/or by way of circuit configuration) to implement various control aspects for carrying out LTE communications as set forth herein. These may include, for example, inter-cell radio resource management 802 (functions related to the radio bearers, such as radio bearer control, radio admission control, radio mobility control, scheduling and dynamic allocation of resources in both uplink and downlink), resource block control 804 (controlling transmission based on resource blocks, each of which consists of a certain sub-carrier bandwidth for a designated time slot/period), connection mobility control 806 (i.e., in-cell radio resource management), radio admission control 808, measurement and measurement reporting configuration for mobility and scheduling 810, and dynamic resource allocation (scheduler) 812. Other functions/functional layers may include radio resource control 814, packet data convergence control 816, radio link control 818, medium access control 820, and a physical layer 822 (which may include the aforementioned I/O block, controllers/amplifiers, etc., and/or antenna and transmission control such as OFDM.)

As noted above, a vehicle system or vehicle consist is a group of two or more vehicles that are mechanically or logically coupled to travel together in coordination. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with no other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a railcar or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and/or at the end of the train.

In cases where the vehicle system includes multiple powered vehicles, the vehicle system may coordinate operations of the powered vehicles to move the vehicle system. For example, a rail vehicle system may include a powered unit consist that has one or more powered units coupled to one or more non-powered rail cars. Vehicles in a consist may include a designated lead powered unit and one or more remote powered units and/or trail powered units. (The lead powered unit may be at the front, or may be located elsewhere but designated as the lead from a control perspective. Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit.) The lead vehicle may control operation of one or more remote vehicles. More specifically, the lead vehicle (e.g., a lead locomotive) may coordinate tractive and braking operations of the different powered units (e.g., remote or trail locomotives) to control movement of the rail vehicle consist (e.g., a train). In some cases, a single train may include a plurality of such locomotive consists. The locomotive consists may communicate with one another to coordinate tractive and braking operations of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

Certain embodiments of the invention relate to vehicle control systems for the wireless remote control of a vehicle or group of vehicles from an off-board location. In such an embodiment, the vehicle control system includes a control unit that is configured to generate control signals for remote control of the vehicle or the group of vehicles. For example, the control unit may be a portable operator control unit (OCU) which is configured to generate the control signals responsive to operator manipulation of a control interface of the OCU. The control unit may also be a remote-control unit which is configured to generate the control signals based on internal program instructions and received sensor signals of vehicle and route operations/conditions. In either case, the control unit may be configured to wirelessly communicate the control signals over a high-frequency network. This refers to a wireless network operating at frequencies of at least 450 MHz, such as an LTE network (public and/or private), or a 5G network (public or private) or other wireless network that operates at a frequency range of (or within) 30 GHz to 300 GHz. In one embodiment, the control system is configured to utilize a public LTE network, as a balance of lower-cost equipment (relative to 5G networks) and improved bandwidth and/or other functionality (relative to proprietary radios and/or other, lower-frequency networks).

Figure 9:
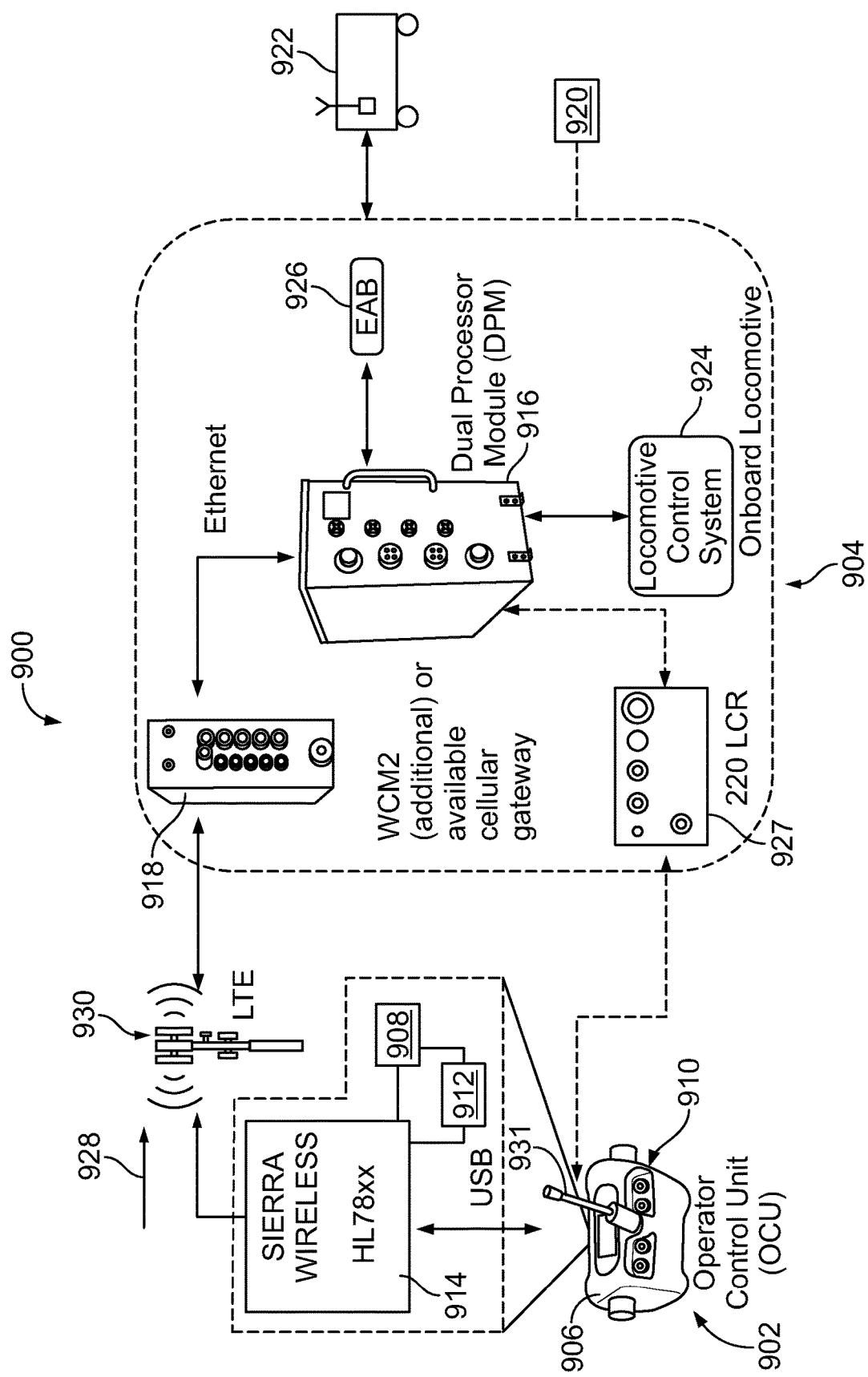
FIG. 9 illustrates an embodiment of a vehicle control system.

FIG. 9 illustrates an embodiment of a vehicle control system 900. The vehicle control system includes a portable OCU 902 and an on-board control unit 904. The OCU includes a housing 906, a power supply 908 inside the housing, a control interface 910 attached to the housing and which is configured to be manipulated by an operator, a controller 912 inside the housing, and a wireless communication unit 914 attached to the housing (e.g., part of the wireless communication unit may be inside the housing and part, such as an antenna, may be outside the housing). The power supply may include an energy storage device (e.g., battery) and/or a power cord for attachment to an external supply of electrical power. The control interface is an input device and optionally may include an output device, such as a display. The control interface can include one or more user input elements, such as a touchscreen with virtual buttons, physical buttons, a joystick, a toggle, and/or the like.

The on-board control unit 904 includes an on-board control unit controller 916 and an on-board control unit wireless communication unit 918. The controller and wireless communication unit are configured for attachment to an electrical power source 920 in a vehicle 922. The vehicle may represent one of the vehicles from the vehicles systems described above, such as the first vehicle 104 in the vehicle system 102 shown in FIG. 1. The entire on-board control unit 904 may be disposed onboard the vehicle. The controller is configured for communicative coupling with at least one of a vehicle controller 924 or a vehicle brake system 926 (e.g., electronic air brake or EAB) of the vehicle. The OCU controller 912 is configured to generate control signals 928 for controlling the vehicle 922 based on operator manipulation of the control interface. The wireless communication unit is configured to wirelessly communicate the control signals to the vehicle over an LTE network 930. The LTE network may be public and/or private, meaning entirely public, entirely private, or a network that includes both public and private portions. The wireless communication unit 918 of the on-board control unit 904 is configured to wirelessly receive the control signals from the OCU over the LTE network. The on-board controller 916 is configured to control the vehicle controller and/or the vehicle brake system based at least in part on the control signals that are received from the OCU. For example, such control actions may include throttle and braking. The on-board control unit may also include a user input/output device 927, such as a display with associated user interface (e.g., touchscreen with virtual buttons, physical buttons, switches, or the like). The display may present information to an operator onboard the vehicle, such as vehicle status information, vehicle location information, and the like.

In another aspect, the on-board control unit 904 is configured to communicate data/information back to the OCU. The data/information may relate to vehicle operations (e.g., movement include speed and heading), vehicle conditions (e.g., engine temperature), and route conditions (e.g., track occupancy, information about the area around the vehicle). The data/information may be generated by sensors associated with the OCU and/or the vehicle and/or the wayside environment. One particular example of such data is video data of the route in front of, behind, and/or to either side of the vehicle.

In an embodiment, the OCU wireless communication unit 914 includes a Sierra Wireless AirPrime® HL78xx series LPWA (low power wide area) module. In other embodiments, the OCU wireless communication unit includes a different model of Sierra Wireless communication module, or a module/system from a different supplier/manufacturer. The OCU may include one or more antennas 931. One example antenna for communicating over the LTE network is a flex patch antenna. The OCU may have plural antennas for signal diversity purposes.

In an alternative embodiment, the OCU is an automatic remote control unit (ARCU) that is not located on-board any vehicle. The ARCU may lack the control interface 910 described above. The ARCU may automatically generate control signals for controlling movement of the vehicle (via the on-board control unit), responsive to received sensor signals. The sensor signals can contain data of movement of the vehicle, movement of other vehicles, route conditions, and/or conditions on-board the vehicle. At least some of the sensor signals may be generated by sensors disposed on-board the vehicle. For example, sensor signals may be communicated, as data messages, from the vehicle over the LTE network to the ARCU. The ARCU analyzes and processes the data and determines, based on internal programming and the received data from the sensors, which control signals to generate for communication back to the vehicle over the LTE network to control movement of the vehicle. The movement of the vehicle may include vehicle speed, acceleration, direction, location, and the like. The movement of other vehicles may be the same or similar characteristics of vehicles in the vicinity of, or communicatively connected to, the vehicle that is being controlled by the ARCU. The route conditions may refer to weather conditions, grade, friction available, and the like. The conditions on-board the vehicle may refer to power output, tractive settings, braking settings, fuel efficiency, noise emissions, battery capacity, fuel supply, and/or the like.

Figure 10:
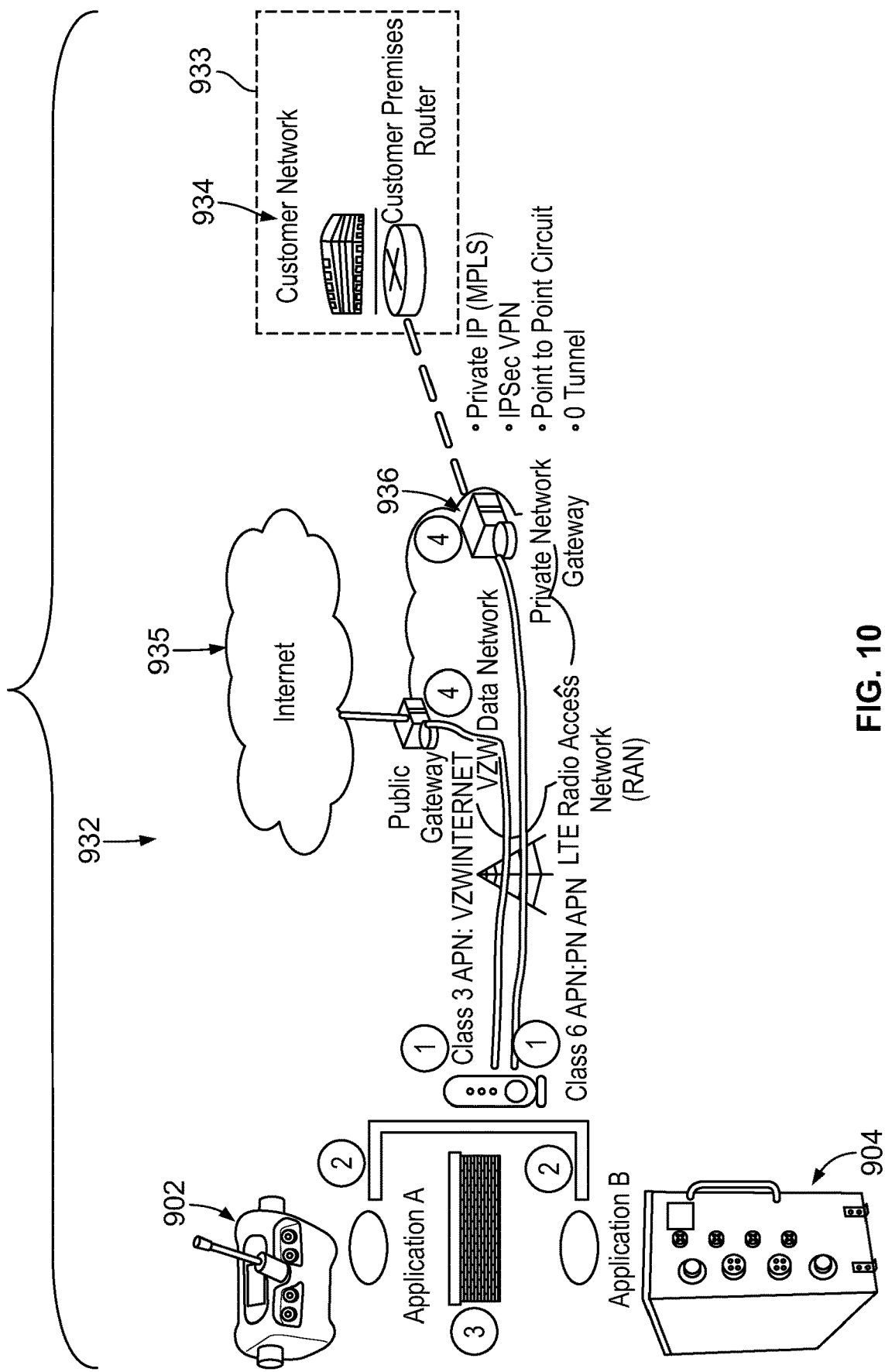
FIG. 10 is a schematic illustration of a vehicle control system according to an embodiment.
Figure 11:
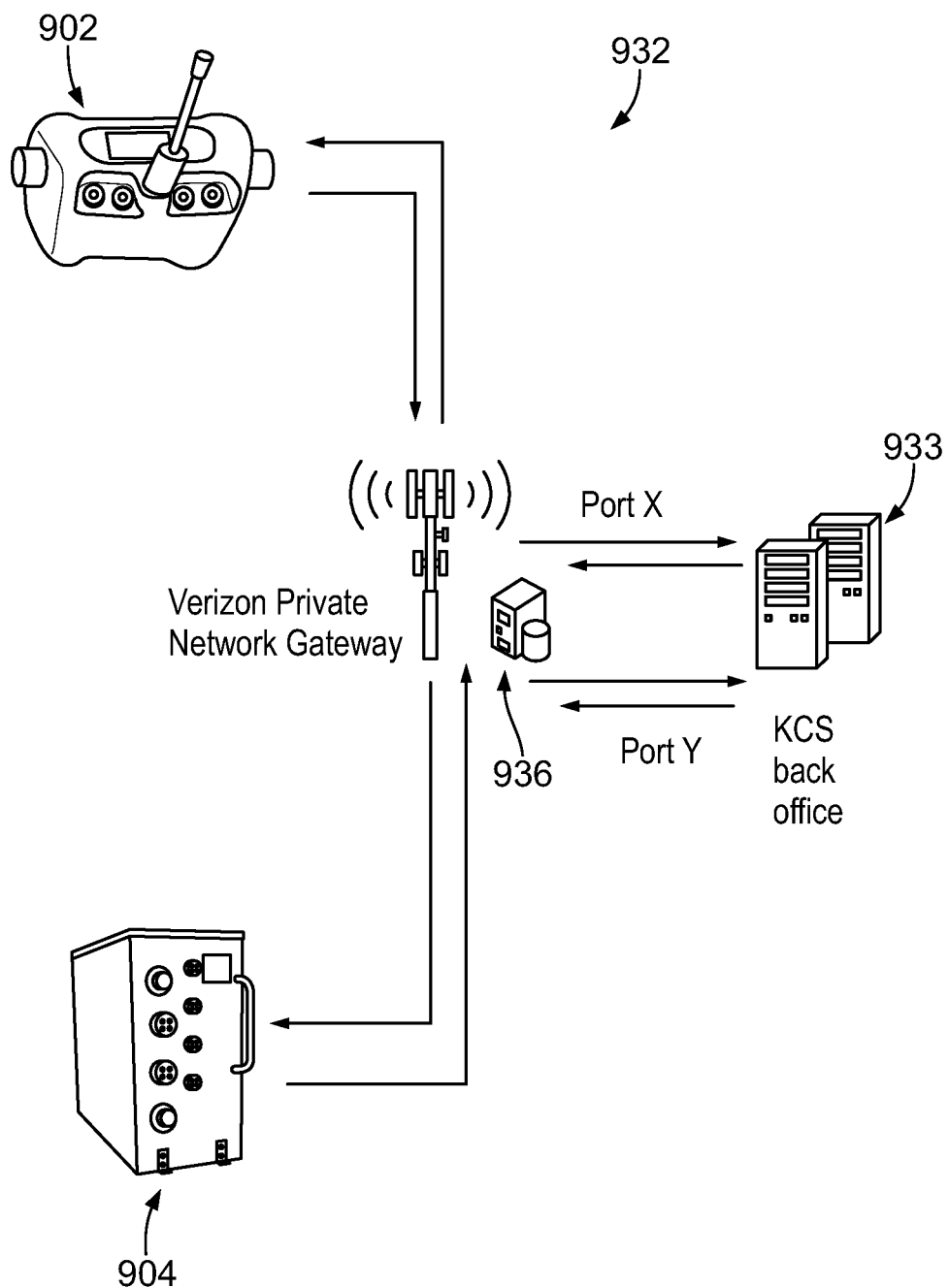
FIG. 11 is another schematic illustration of the vehicle control system.

FIG. 10 is a schematic illustration of a vehicle control system 932 according to an embodiment. FIG. 11 is another schematic illustration of the vehicle control system 932. The vehicle control system 932 may include the system 900 of FIG. 9. The system 932 may reflect additional functionality, such as communication and coordination with a back office 933. The back office may be a dispatch facility operated by an owner and/or operator of the vehicle 922. Specifically, the system is configured for split data routing, whereby the wireless units 902, 904 are configured to have dual data sessions using a single wireless connection. Here, APN (access point name) Class 3 is assigned as VZWINTERNET (in the case of using Verizon as a service provider, as an example), and the APN Class 6 is assigned the enterprise PN APN (e.g., the APN associated with the private network 934 of the user/operator). The wireless devices will route Internet-designated data traffic using the Class 3 APN VZWIN-TERNET which will inform VZW data network to route to a public gateway for accessing the Internet 935. Data traffic categorized for the private network 934 will be assigned to the Class 6 PN APN so the VZW data network will route the data traffic to the specific private network gateway 936 with the connectivity of the user/operator to their network.

Figure 12:
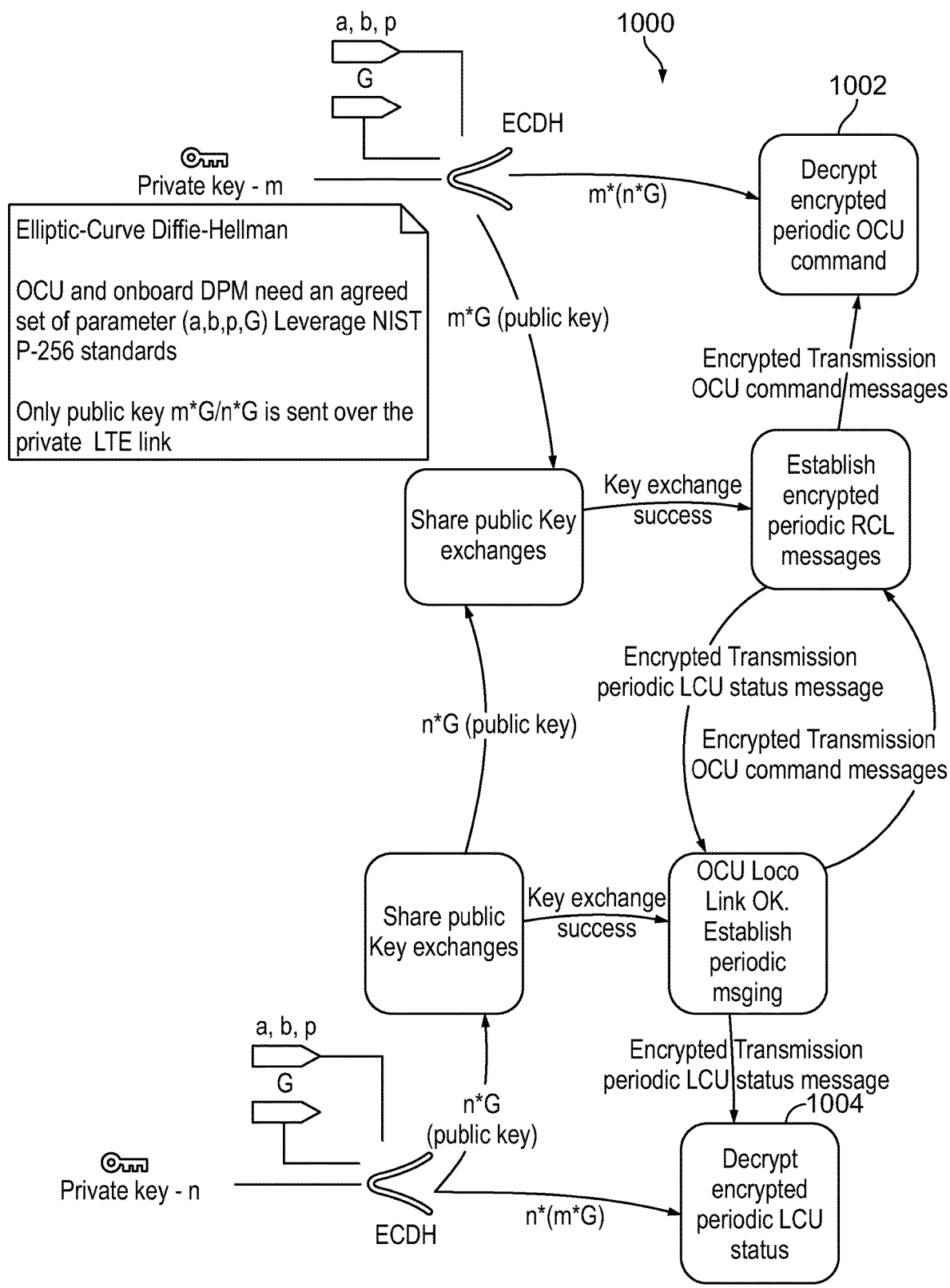
FIG. 12 illustrates a flow diagram of control operations of a vehicle control system according to an embodiment.

FIG. 12 illustrates a flow diagram of control operations of a vehicle control system 1000 according to an embodiment. The vehicle control system 1000 may have the same or similar architecture as the vehicle control systems 900, 932 of FIG. 9 through 11, but the system additionally includes one or more data and/or communication security measures to ensure the integrity of the OCU-to-vehicle communications. As one example, the system may implement asymmetric cryptography on top of private LTE. Asymmetric encryption, also known as public key cryptography, uses two keys for the encryption and decryption. Each device creates a public-key/private-key pair. In the asymmetric encryption utilized by the vehicle control system 1000, the OCU and on-board control unit may have an agreed-upon set of parameters (e.g., parameters a, b, p, G in FIG. 12) for a private key. Only one or more public keys (e.g., m*G, n*G) are sent over the private LTE link. The private keys are not sent over the LTE link. Once the public keys have been exchanged, a message from the on-board control unit to the OCU is encrypted by the on-board control unit using the private key of the on-board control unit and the public key of the OCU. The OCU decrypts the message using the private key of the OCU and the public key of the on-board control unit.

In an embodiment, the vehicle control system uses the asymmetric encryption to exchange a symmetric key over-the-air via the LTE network. The asymmetric encryption protects the integrity of the symmetric key (e.g., prevents interception and/or tampering with the symmetric key) during the exchange. Once both the OCU and the on-board control unit have the symmetric key, symmetric encryption (using the symmetric key) can be implemented for subsequent messages between the two parties. The symmetric encryption may utilize the Advanced Encryption Standard (AES).

The OCU-to-vehicle communications can include periodic OCU control commands 1002 to the on-board control unit and periodic status messages 1004 from the on-board control unit to the OCU. Before these communications can be transmitted, the OCU links to the on-board control unit over the LTE network. In an embodiment, the linking process includes a modified link request—reply—confirm scheme. For example, the on-board control unit may initiate the linking process by communicating a link request message to the OCU. The link request message includes the public key of the on-board control unit within the body or payload of the message. Upon receipt, the OCU communicates a link reply message back to the on-board control unit. The link reply message includes the public key of the OCU within the body or payload of the message. This initial exchange over the LTE network ensures that both parties have both public keys. The on-board control unit, upon receipt of the link reply message, generates and communicates a link confirm message to the OCU. The link confirm message is asymmetrically encrypted by the on-board control unit using the private key of the on-board control unit and the public key of the OCU (received in the link confirm message). The link confirm message includes a symmetric key within the body or payload of the message. As such, the symmetric key within the payload is asymmetrically encrypted. The OCU receives the link confirm message and decrypts the link confirm message using the private key of the OCU and the public key of the on-board control unit, to decipher the symmetric key.

Once the OCU has the symmetric key, the symmetric key may be used for all or at least some subsequent messages between the on-board control unit and the OCU. For example, the control commands 1002 from the OCU to the on-board control unit may be encrypted using the symmetric key, and the status messages 1004 from the on-board control unit to the OCU may also be encrypted using the symmetric key. This linking process ensures that the link handshaking is secure and can only be utilized once. Compared to asymmetrically encrypting each message communicated between the OCU and the on-board control unit, using the symmetric key to encrypt the messages may be less computationally intensive and more efficient.

In an embodiment, the asymmetric cryptography includes or represents an elliptic-curve Diffie—Hellman (ECDH) key exchange protocol, which enables the two parties (e.g., the OCU and the on-board control unit) to establish shared secrets over an insecure channel in the private LTE network. Optionally, the on-board control unit may use TweetNaCl, which is a small reimplementation of the Networking and Cryptographic library. The asymmetric encryption may use the XSalsa20 stream cypher, which uses the original 32-byte key and the first 16 bytes of the nonce to generate an intermediate 32-byte key, and then uses Salsa20 with the intermediate key and the remaining 16 bytes of nonce/counter to generate each output block. Optionally, the control commands from the OCU and the status messages from the on-board control unit may be encrypted using the AES Cipher Block Chain (CBC) method. The block size and/or key size may be 128 bits. The AES symmetric key exchanged in the link confirm message optionally may be used for all command and status data communications.

Figure 13:
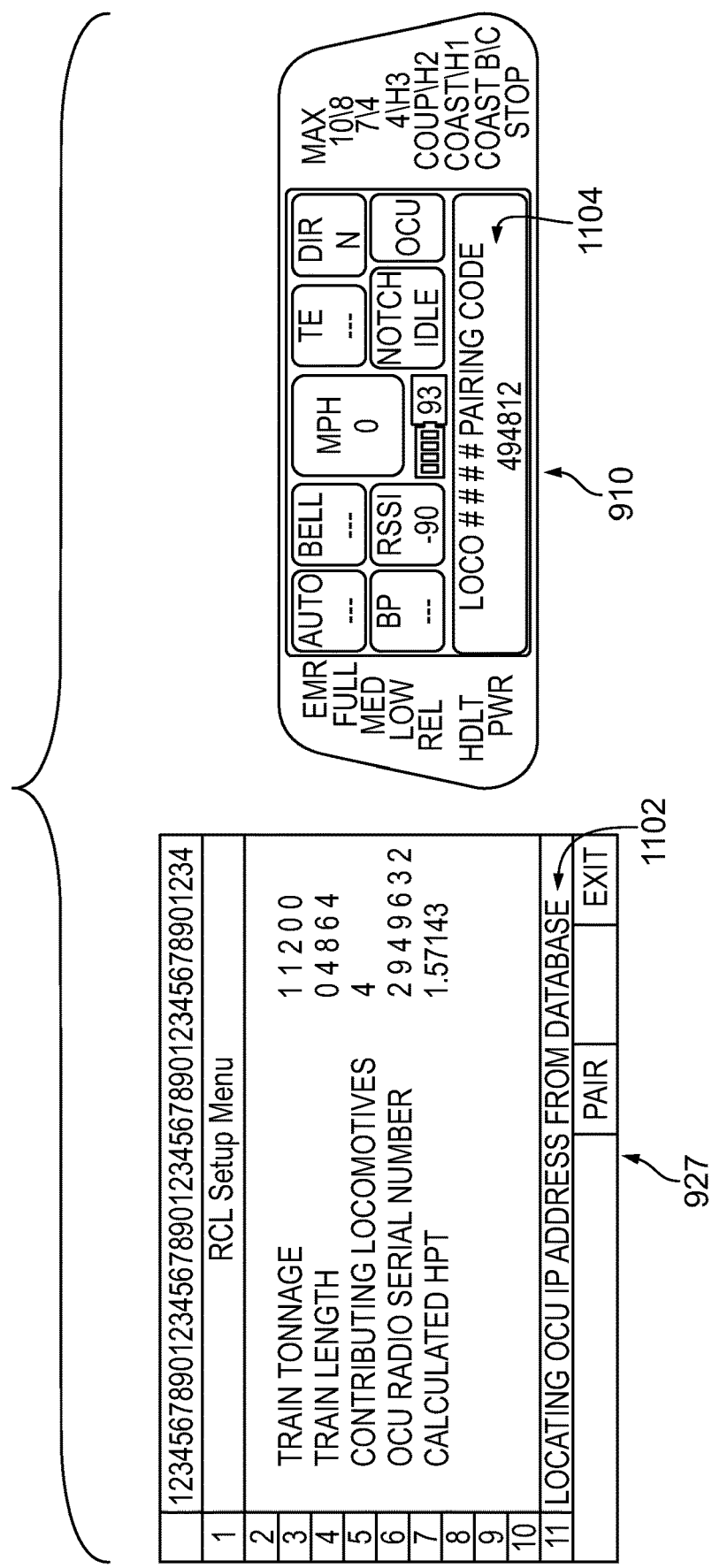
FIG. 13 illustrates a control interface of an operator control unit (OCU) and a display of an on-board control unit according to an embodiment.
Figure 14:
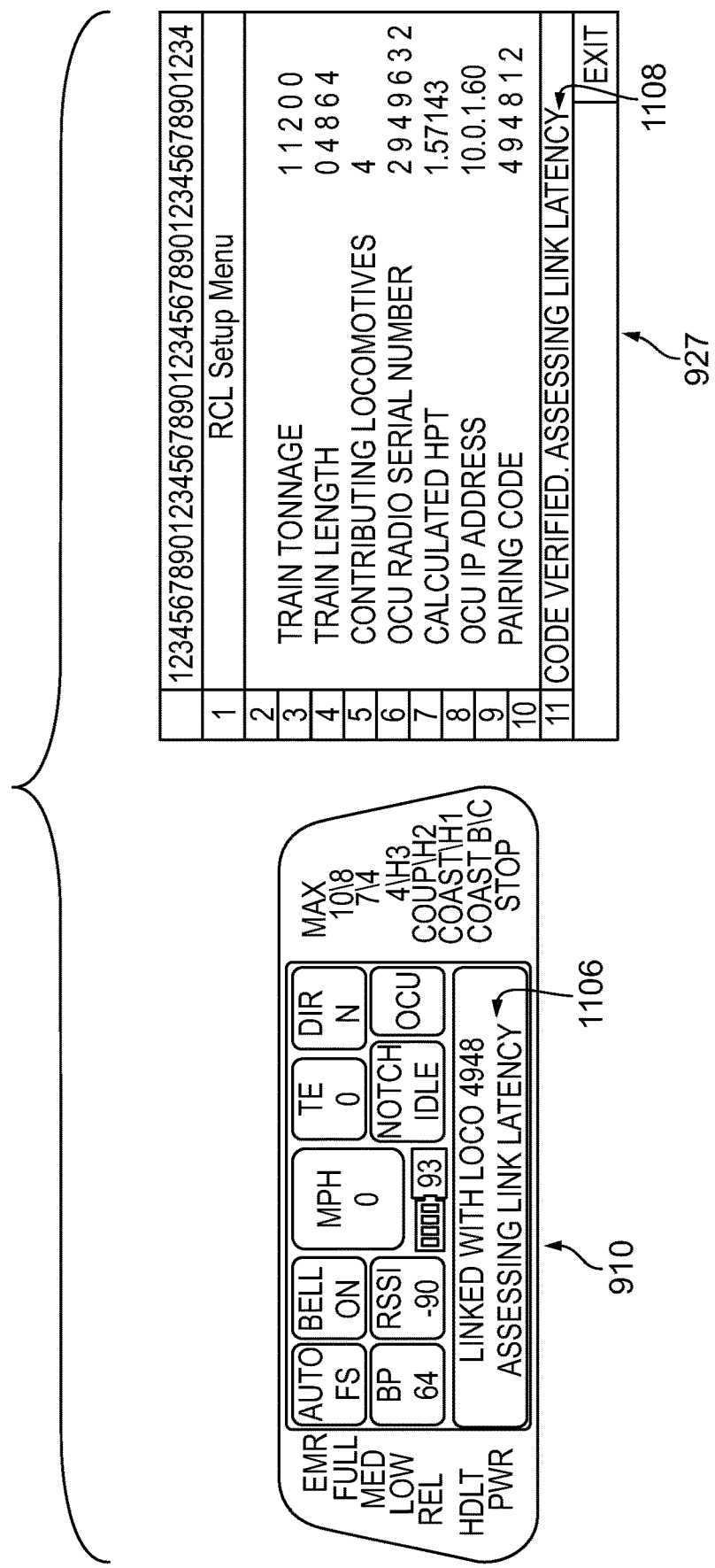
FIG. 14 illustrates the control interface of the OCU and the display of the on-board control unit subsequent to the time shown in FIG. 13 according to an embodiment.

The vehicle control systems (e.g., 900, 932, 1000) may be used for remote control of a locomotive or other rail vehicle, which can be referred to as remote control locomotive or RCL for short. With reference to FIGS. 13 and 14, the RCL linking between the OCU and the on-board control unit may be integrated with a distributed power linking or control portion of the rail vehicle control system. That is, instead of having a separate RCL linking setup, the vehicle control system integrates the RCL linking with the distributed power setup. As described above, "distributed power" refers to a consist (group) of vehicles where one vehicle in the consist controls one or more of the other vehicles in the consist, for coordinated control, e.g., of braking and throttle. The distributed power coordinated control may be performed using wired connections and/or a wireless network. FIG. 13 illustrates the control interface 910 of the OCU and the display of the input/output device 927 of the on-board control unit according to an embodiment. The linking between the OCU and the on-board control unit, for both distributed power (DP) and remote control, may be initiated using the device 927 on-board the vehicle, such as within a menu for initiating a DP/RCL remote session. For example, a single touch input may initiate the linking for both remote control and distributed power. During movement of the vehicle system along the route, the control commands received from the OCU may be communicated to the lead vehicle of the DP arrangement, which communicates with the trail vehicles of the DP arrangement based on the received control commands. The input/output device in FIG. 13 displays a status message 1102 that indicates that the IP address of the OCU is being located from a database. The control interface of the OCU displays a status message 1104 at the same or a similar time period as the message 1102 is displayed. The status message 1104 indicates that a locomotive pairing code "494812" has been received at the OCU.

FIG. 14 illustrates the control interface 910 of the OCU and the display of the input/output device 927 of the on-board control unit subsequent to the time shown in FIG. 13 according to an embodiment. In FIG. 14, the control interface of the OCU displays a status message 1106 that indicates that the OCU is linked with "Locomotive 4948," and link latency is being assessed. The display of the input/output device displays a status message 1108 that indicates that the on-board control unit has verified a code, and is assessing link latency.

Figure 15:
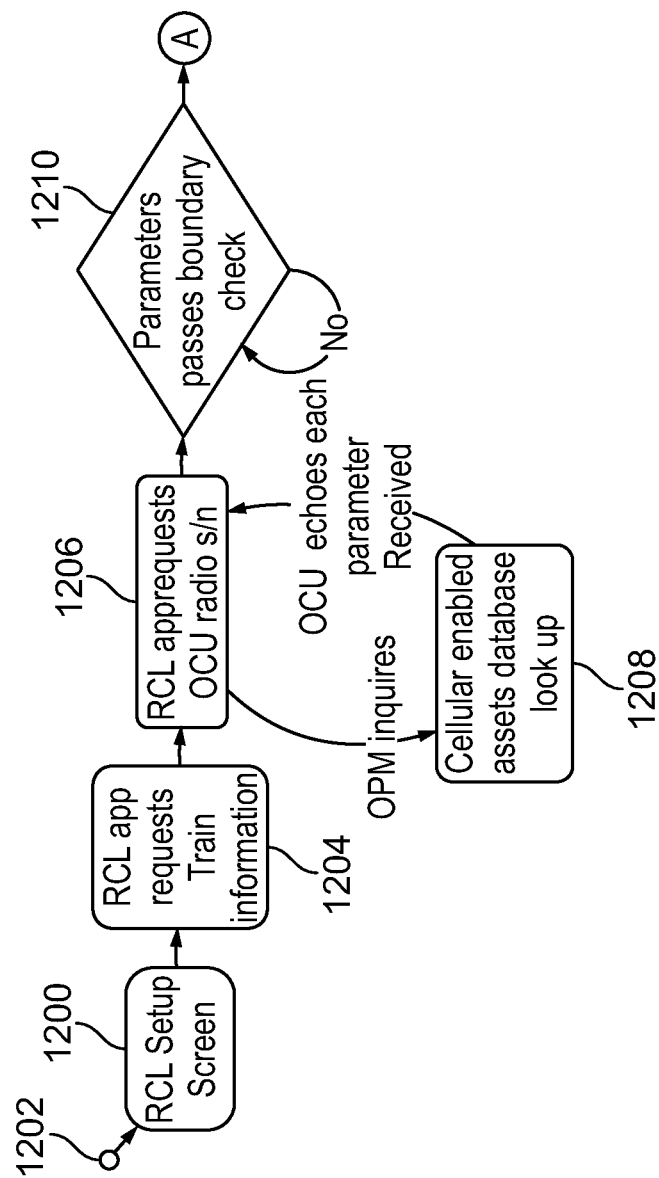
FIG. 15 illustrates a first portion of one example of a control flow for any of the vehicle control systems shown in FIG. 9 through 14.
Figure 15:
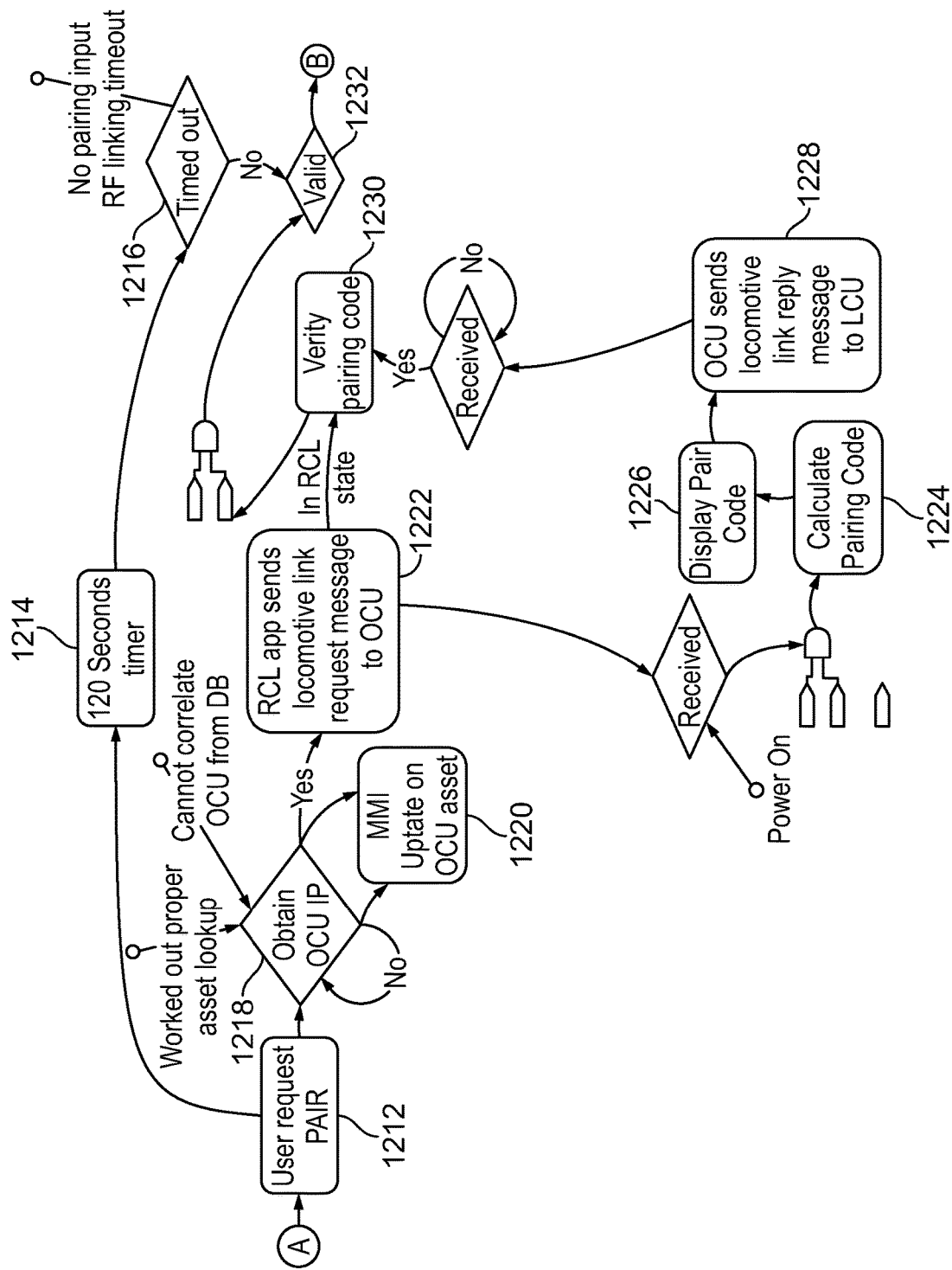

FIG. 15 illustrates a first portion of one example of a control flow for any of the vehicle control systems shown in FIG. 9 through 14. Various operations described in the control flow may be performed by the on-board control unit 904, such as the on-board controller 916 of the control unit. The control flow represents a non-limiting example of the linking and remote control procedure between the OCU and the on-board control unit on the vehicle. At 1200, a user input 1202 is submitted to an OCU remote control (e.g., RCL) setup screen on the input/output device of the on-board control unit on the vehicle. Th user input initiates the linking and remote control procedure. According to one aspect, the vehicle control system may be configured so that the OCU must be present on or at least in the proximity of the vehicle (at least initially) to link the OCU with the on-board vehicle control system. The linking process may require initiation using the input/output device on the vehicle to ensure that the user or operator is present on-board the vehicle for at least initiating the linking process. The user that initiates the linking process optionally may carry (e.g., possess) the OCU. In an embodiment, the on-board control unit and/or OCU may be prohibited (e.g., via programmed instructional constraints) to begin the linking sequence from the OCU, instead of from the on-board control unit, without at least verifying that the OCU is proximate to the vehicle asset, as described in more detail with reference to 1234 in FIG. 16. For example, the on-board control unit may not respond to wireless link pairing requests from OCU devices that are outside of a designated proximity radius (e.g., 50 feet, 100 feet, 200 feet, or the like) relative to the vehicle.

At 1204, the on-board control unit controller (e.g., an RCL "app" running on the controller) requests vehicle information. At 1206, the on-board controller requests an OCU wireless communication unit (or radio) identifier, such as a serial number. At 1208, there is cellular-enabled assets database lookup, e.g., between the OCU and the on-board control unit. For example, the owner and/or operator of the vehicle may keep a database of assets (e.g., vehicles, OCUs, etc.) that are cellular-enabled. In an embodiment, the OCU IP address is obtained from a private LTE server. This may involve integrating with the back office of the user/operator and specific private cell setup (as above), and/or the lookup of the OCU serial number to IP address may reside locally with the on-board control unit.

At 1210, the received vehicle information is checked as being within designated parameters, for validity. At 1212, if the vehicle information that is received is within the designated parameters, the user requests pairing the vehicle on-board control unit with the OCU. This may include setting a timer at 1214, e.g., 120 seconds, within which time period the OCU must be linked or the pairing attempt is halted (at timeout 1216). At 1218, an IP address of the OCU is obtained. At 1220 there may be a man machine interface (MMI) update on the OCU asset.

At 1222, if an OCU UP address has been obtained, pairing commences. The pairing can include the on-board control unit (e.g., the RCL app running on the on-board controller) transmitting a link request message to the OCU associated with the IP address. The link request message may include vehicle number, link initiation time to allow for OCU event logging, and vehicle LTE communication IP address.

The pairing may also include calculating a pairing code at 1224, and displaying the pairing code at 1226. For example, the OCU may generate the pairing code. The on-board control unit may construct the pairing code using the OCU radio serial number and OCU reply link response time, e.g., as entered by the user. The OCU then displays the pairing code at 1226 on a screen, such as a screen of the OCU. The OCU may display the pairing code, as shown in the message 1104 in FIG. 13. The operator then can input the pairing code into in input device onboard the vehicle. This ensures that the operator is present at the vehicle at least during the linking process.

The OCU sends a link reply message, at 1228, back to the on-board control unit to acknowledge the vehicle's request (with operator on board) to link. The link reply message may include, for example, OCU application version info, link response time (e.g., 32 bits) to allow for the vehicle DP/RCL application to derive the pairing code and for event logging, corresponding associated OCU LTE modem IP address, etc. In an embodiment, the pairing code is not sent in the link reply message from the OCU. The on-board control unit may be configured to enforce a maximum time (e.g., 2 minutes) to allow the user to enter in the pairing code based on the OCU reply link response time. This prevents someone from replicating a new RCL link session from a past recorded session. In an embodiment, the OCU is configured to deny generation of a pairing code if the vehicle link request time is not within a designated time period (e.g., 5 minutes) of current epoch. This prevents a third party from initiating a link session from past recorded traffic.

The on-board control unit may process the link reply message from the OCU through a hash function to yield a pairing code. The hash function may be the following, where buf is the byte array of the link reply message data elements, len is the number of bytes in the message, and maxVal is 1,000,000, which may yield a 6-digit pairing code. In a non-limiting example, the hash function may be represented as:

```
uint32_t getStableHash(uint8_t *buf, size _t len, uint32_t maxVal)
{
   uint32_t hash = 0;
   while (len)
   {
      hash += (uint32_t)(*buf++);
      hash += (hash << 10);
      hash ^= (hash >> 6);
      --len;
   }
   // final avalanche
   hash += (hash << 3);
   hash ^= (hash >> 11);
   hash += (hash << 15);
   return (hash % maxVal);
}
```

As an example, if the link reply message includes the following 23-byte buffer:

```
#define LINK_REPLY_LEN (23)
uint8_t LinkReplyMsg[LINK_REPLY_LEN] =
{
   0x21, 0x00, 0x00, 0x00, 0x00, 0x00, 0x00, 0x00,
   0x00, 0x5E, 0x20, 0x63, 0xC7, 0x06, 0x02, 0x16,
   0x00, 0xEE, 0xA9, 0x86, 0x00, 0x00, 0x00
};
```

In the above example, the resulting pairing code is 012047.

The on-board controller may verify the pairing code at 1230 by comparing the internally calculated pairing code, which is based on the hash of the link reply message, to the operator's input of the pairing number on the vehicle input device. If the pairing code is valid at 1232 (e.g., the pairing codes match), flow proceeds via "A" to the second portion of the control flow shown in FIG. 16.

Figure 16:
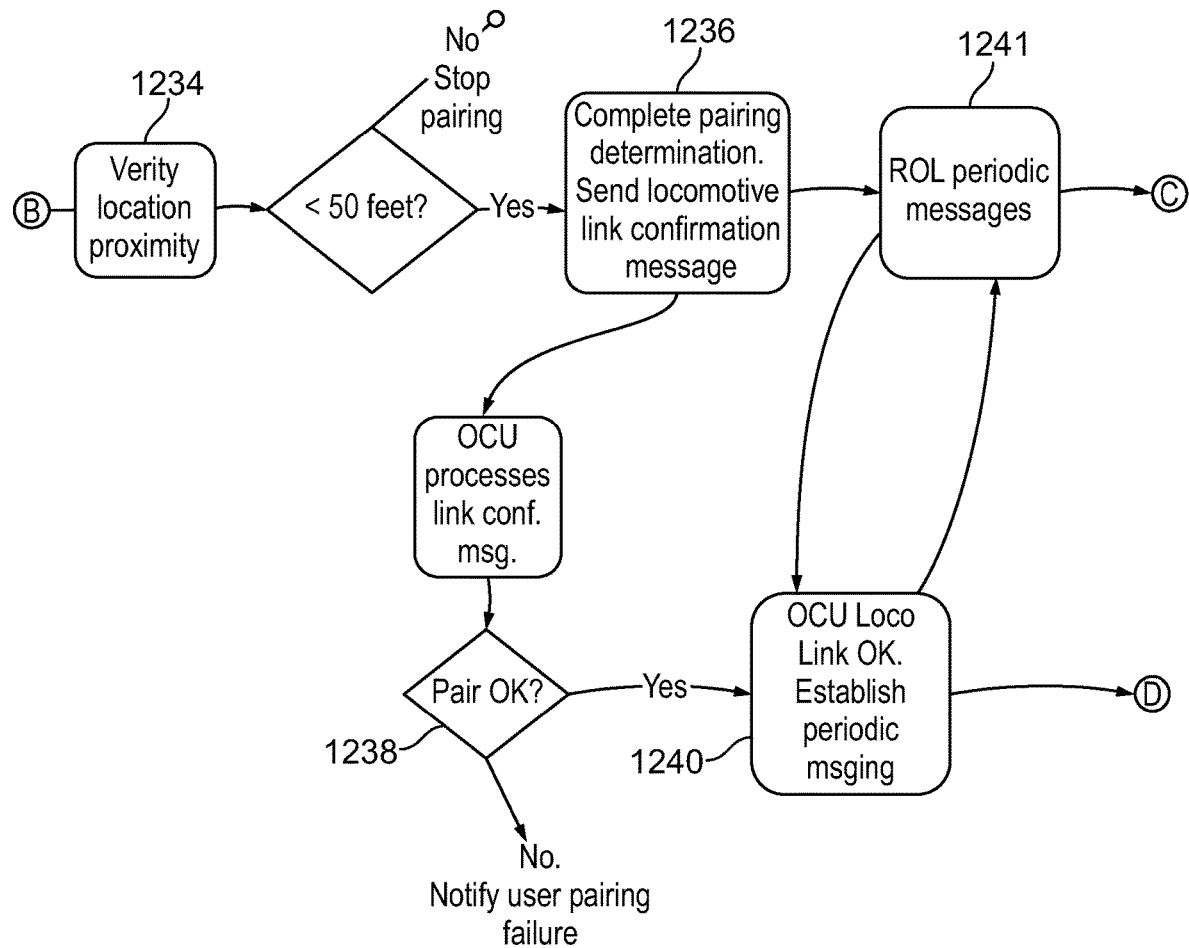
FIG. 16 illustrates a second portion of the control flow shown in FIG. 15.
Figure 16:
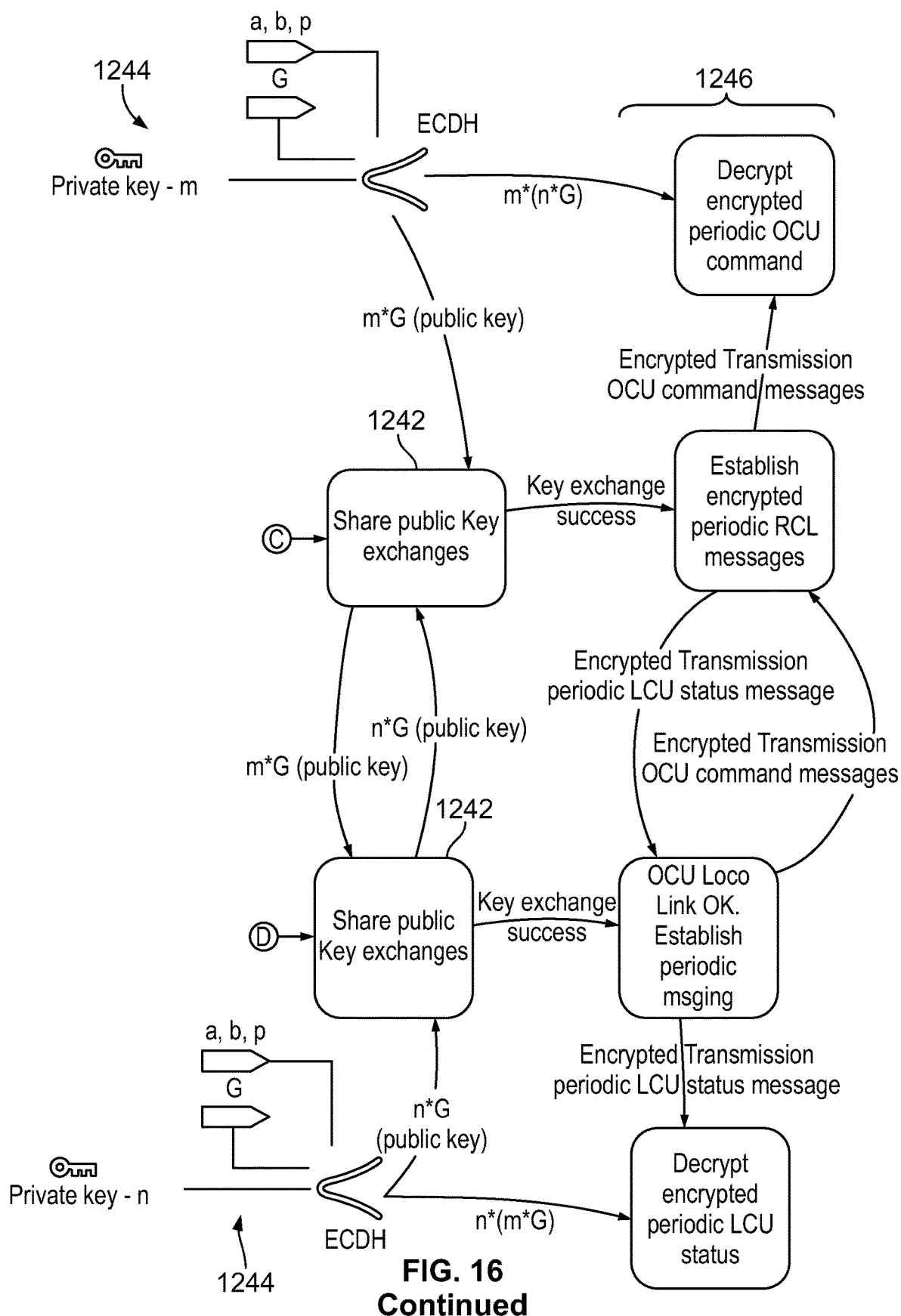

FIG. 16 illustrates a second portion of the control flow shown in FIG. 15. At 1234, a location proximity of the OCU to the vehicle is verified. One prerequisite for linking may be that the OCU must be within a designated radius, such as 50 feet, of the vehicle to be controlled. The location of the OCU can be determined using a location determining device in the OCU. The location-determining device may be a GPS receiver. The positional coordinates of the OCU may be compared to the positional coordinates of the vehicle, based on an on-board GPS receiver or other location-determining device, to determine the relative proximity of the OCU to the vehicle.

If the proximity prerequisite is satisfied, the pairing is completed and a link confirmation is sent to the vehicle, at 1236. If the link confirmation message is determined by the OCU to be OK (e.g., the information is correct and timely), as at 1238, periodic messaging may commence between the OCU and the on-board control unit, at 1240. The periodic messaging at 1241 can include the OCU transmitting control signals to the on-board control unit for controlling movement of the vehicle, such as tractive and braking efforts, from off-board the vehicle. For security, the messaging may include data encryption by way of sharing public keys, at 1242, in conjunction with private keys, at 1244. After data encryption is established, encrypted transmissions may commence, at 1246.

In an embodiment, the wireless communication unit 914 for the OCU or remote control unit is configured as a plug-in module or is otherwise configured for attachment to an existing OCU or remote control unit that is presently configured for wireless communication using proprietary radios. That is, instead of the unit 914 being "built into" the OCU in place of a proprietary radio, the radio remains in place and the unit 914 is operably coupled to the OCU for the OCU to additionally or alternatively communicate wirelessly over a high-frequency network, e.g., public or private LTE.

In an embodiment, the system uses a back office inventory management system to identify communication paths best suited between a remote controlled vehicle (e.g., the on-board control unit) and an OCU/remote control unit. Communication of the best communication paths may be carried out using the configuration of the system as shown in any of FIG. 10 through 12, and the system may be configured to switch between available paths accordingly.

In an embodiment, the system is configured for background latency checks to be used to ensure the remote control communication path is suitable for remote vehicle control. For example, the system may be configured so that once a link code is verified, a link latency (of the current transmission) is baselined (i.e., recorded as a baseline). After the OCU commences sending command messages or other control signals, the on-board control unit continuously assesses round trip time latency to not to exceed to configurable delay.

The system may be configured for the exchange of IP-addressed packet data between the OCU or remote control unit and the on-board control unit, e.g., vehicle control may be carried out by communicating command messages over the network. Thus, references to "control signals" or the like includes designated commands, in the form of data packets or otherwise, that the recipient (e.g., the on-board control unit) is configured to receive, interpret (de-code), and act upon, as applicable.

In one or more embodiments, a vehicle control system is provided that includes a portable operator control unit (OCU). The OCU includes a housing, a power supply inside the housing, a controller inside the housing, and a wireless communication unit attached to the housing. The controller is configured to generate control signals for controlling a vehicle from an off-board location of the OCU. The wireless communication unit is configured to wirelessly communicate the control signals to the vehicle over an LTE network.

Optionally, the LTE network includes a public LTE network. Optionally, the LTE network includes a 5G network. The wireless communication unit may be configured to wirelessly communicate the control signals to the vehicle in a frequency range from 30 GHz to 300 GHz.

Optionally, the vehicle is a locomotive, and the control signals are configured to control tractive efforts and braking efforts of the locomotive.

Optionally, the OCU further includes a control interface attached to the housing and configured to be manipulated by an operator. The controller may be configured to generate the control signals based on operator manipulation of the control interface.

Optionally, the OCU is an automatic remote vehicle control unit that is not located on-board any vehicles. The OCU may be configured to automatically generate the control signals responsive received sensor signals. The sensor signals may contain data of movement of the vehicle, movement of other vehicles, route conditions, and/or conditions onboard the vehicle.

Optionally, the OCU is configured for linking with an on-board control unit of the vehicle, for remote control of the vehicle by the OCU, only if the OCU is either on-board the vehicle or within a designated proximity range of the vehicle for initiating the linking. Optionally, the OCU is configured for linking with an on-board control unit of the vehicle, for remote control of the vehicle by the OCU, only if the on-board control unit of the vehicle initiates the linking.

Optionally, the controller of the OCU is configured to encrypt the control signals by sharing public keys with the on-board control unit over the LTE network.

In one or more embodiments, a vehicle control system is provided that includes an on-board control unit that has a controller and a wireless communication unit configured for operable coupling with the controller. The controller and wireless communication unit are configured for attachment to an electrical power source in a vehicle. The controller is configured for communicative coupling with at least one of a vehicle controller or a brake system of the vehicle. The wireless communication unit is configured to wirelessly receive control signals from an off-board operator control unit (OCU) over an LTE network. The controller is configured to control the at least one of the vehicle controller or the brake system based at least in part on the control signals that are received from the OCU.

Optionally, the LTE network includes a public LTE network. Optionally, the LTE network includes a 5G network. Optionally, the wireless communication unit is configured to wirelessly receive the control signals from the OCU within a frequency range from 30 GHz to 300 GHz.

Optionally, the vehicle is a locomotive.

Optionally, the on-board control unit is configured for linking with the OCU, for remote control of the vehicle by the OCU, only if the OCU is one of located on-board the vehicle or within a designated proximity range of the vehicle for initiating the linking. Optionally, the on-board control unit is configured for linking with the OCU, for remote control of the vehicle by the OCU, only if the on-board control unit of the vehicle initiates the linking.

Optionally, the vehicle is a first vehicle in a vehicle system that includes the first vehicle and plural second vehicles, and the on-board control unit is operably connected to a mobile server unit configured to be on-board the vehicle. The mobile server unit may be configured to establish a second LTE network with the plural second vehicles. Optionally, the wireless communication unit of the on-board control unit is configured to wirelessly communicate distributed power control signals to the plural second vehicles over the second LTE network for controlling tractive and braking efforts of the plural second vehicles. The distributed power control signals may be based on the control signals received from the OCU over the LTE network.

In one or more embodiments, a vehicle control system is provided that includes a portable operator control unit (OCU) and an on-board control unit. The OCU includes a housing, a power supply inside the housing, a control interface attached to the housing that is configured to be manipulated by an operator, an OCU controller inside the housing, and an OCU wireless communication unit attached to the housing. The on-board control unit includes an on-board controller and an on-board wireless communication unit configured for operable coupling with the on-board controller. The on-board controller and on-board wireless communication unit are configured for attachment to an electrical power source in a vehicle. The on-board controller is configured for communicative coupling with at least one of a vehicle controller or a brake system of the vehicle. The OCU is configured for linking with the on-board control unit, for remote control of the vehicle by the OCU, by the OCU wireless communication unit wirelessly communicating control signals to the on-board wireless communication unit over a public LTE network.

The various components and modules described herein may be implemented as part of one or more computers, computing systems, or processors. The computer, computing system, or processor may include a microprocessor. The microprocessor may be connected to a communication bus. The computer or processor may also include a memory. The memory may include random access memory (RAM) and read only memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" or "controller" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system" or "controller."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. As used herein, the terms "including," "includes," and "in which" are used as the plain-English equivalents of the respective terms "comprising," "comprises," and "wherein." Moreover, the terms "first," "second," and "third," etc. are used merely as labels, and are not intended to impose numerical requirements on their objects.

This written description uses examples to disclose several embodiments, and also to enable any person skilled in the art to practice the embodiments, including making and using any devices or systems and performing any incorporated methods. The patentable scope may include other examples that occur to one of ordinary skill in the art. Such other examples are intended to be within the scope of the invention if they have structural elements that do not differ from the literal language herein, or if they include equivalent structural elements with insubstantial differences from the literal languages used herein.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A vehicle control system comprising:
a portable operator control unit (OCU), the OCU comprising a housing, a power supply inside the housing, a controller inside the housing, and a wireless communication unit attached to the housing,
the controller configured to generate control signals for controlling a vehicle from an off-board location of the OCU, the wireless communication unit configured to wirelessly communicate the control signals to the vehicle over an LTE network,
the OCU configured to link with an on-board control unit of the vehicle, for remote control of the vehicle by the OCU, only if the on-board control unit of the vehicle initiates the linking.

2. The system of claim 1, wherein the LTE network includes a public LTE network.

3. The system of claim 1, wherein the LTE network includes a 5G network.

4. The system of claim 1, wherein the wireless communication unit is configured to wirelessly communicate the control signals to the vehicle in a frequency range from 30 GHz to 300 GHz.

5. The system of claim 1, wherein the vehicle is a locomotive and the control signals are configured to control tractive efforts and braking efforts of the locomotive.

6. The system of claim 1, wherein the OCU further comprises a control interface attached to the housing and configured to be manipulated by an operator, the controller configured to generate the control signals based on operator manipulation of the control interface.

7. The system of claim 1, wherein the OCU is an automatic remote vehicle control unit, not located on-board any vehicles, the OCU configured to automatically generate the control signals responsive received sensor signals, the sensor signals containing data of one or more of movement of the vehicle, movement of other vehicles, route conditions, or conditions onboard the vehicle.

8. The system of claim 1, wherein the OCU is configured for linking with the on-board control unit of the vehicle only if the OCU is one of on-board the vehicle or within a designated proximity range of the vehicle for initiating the linking.

9. The system of claim 1, wherein the controller of the OCU is configured to encrypt the control signals by sharing public keys with the on-board control unit over the LTE network.

10. A vehicle control system comprising:
an on-board control unit comprising a controller and a wireless communication unit configured for operable coupling with the controller, the controller and wireless communication unit configured for attachment to an electrical power source in a vehicle, the controller configured for communicative coupling with at least one of a vehicle controller or a brake system of the vehicle, the on-board control unit configured for linking with an off-board operator control unit (OCU) over a 5G LTE network for remote control of the vehicle by the OCU, wherein the on-board control unit is configured to only link with the OCU if the OCU is one of located on-board the vehicle or within a designated proximity range of the vehicle at a time that the linking is initiated, and
responsive to the wireless communication unit receiving control signals from the OCU over the 5G LTE network, the controller is configured to control tractive efforts and braking efforts of the vehicle based at least in part on the control signals that are received from the OCU.

11. The system of claim 10, wherein the 5G LTE network includes a public LTE network.

12. The system of claim 10, wherein the wireless communication unit is configured to wirelessly receive the control signals from the OCU within a frequency range from 30 GHz to 300 GHz.

13. The system of claim 10, wherein the vehicle is a locomotive.

14. The system of claim 10, wherein the on-board control unit is configured for linking with the OCU, for remote control of the vehicle by the OCU, only if the on-board control unit of the vehicle initiates the linking.

15. The system of claim 10, wherein the vehicle is a first vehicle in a vehicle system that includes the first vehicle and plural second vehicles, and the on-board control unit is operably connected to a mobile server unit configured to be on-board the vehicle, the mobile server unit configured to establish a second LTE network with the plural second vehicles.

16. The system of claim 15, wherein the wireless communication unit of the on-board control unit is configured to wirelessly communicate distributed power control signals to the plural second vehicles over the second LTE network for controlling tractive and braking efforts of the plural second vehicles, the distributed power control signals based on the control signals received from the OCU over the LTE network.

17. The system of claim 10, wherein the controller of the OCU is configured to encrypt the control signals by sharing public keys with the on-board control unit over the 5G LTE network.

18. A vehicle control system comprising:
a portable operator control unit (OCU), the OCU comprising a housing, a power supply inside the housing, a control interface attached to the housing that is configured to be manipulated by an operator, an OCU controller inside the housing, and an OCU wireless communication unit attached to the housing; and
an on-board control unit comprising an on-board controller and an on-board wireless communication unit configured for operable coupling with the on-board controller, the on-board controller and on-board wireless communication unit configured for attachment to an electrical power source in a vehicle, the on-board controller configured for communicative coupling with at least one of a vehicle controller or a brake system of the vehicle,
the OCU configured for linking with the on-board control unit, for remote control of the vehicle by the OCU, by the OCU wireless communication unit wirelessly communicating control signals to the on-board wireless communication unit over a public LTE network, the OCU controller configured to encrypt the control signals by sharing public keys with the on-board control unit over the public LTE network.

19. The vehicle control system of claim 18, wherein the OCU is configured for linking with the on-board control unit of the vehicle for remote control of the vehicle by the OCU, only if the on-board control unit of the vehicle initiates the linking.

* * * * *